United States Patent [19]

Niwa et al.

[11] Patent Number: 4,473,499

[45] Date of Patent: Sep. 25, 1984

[54] REACTIVE DISAZO DYES CONTAINING AN OXY FLUORO TRIAZINE GROUP FOR CELLULOSE CONTAINING FIBERS

[75] Inventors: Toshio Niwa; Toshio Hihara, both of Kanagawa, Japan

[73] Assignee: Mitsubishi Chemical Industries Limited, Tokyo, Japan

[21] Appl. No.: 400,201

[22] Filed: Jul. 20, 1982

[30] Foreign Application Priority Data

Jul. 20, 1981 [JP] Japan .............................. 56-113259
Dec. 23, 1981 [JP] Japan .............................. 56-208497
Feb. 3, 1982 [JP] Japan .............................. 57-15699

[51] Int. Cl.³ ................. C09B 62/03; C09B 62/09; D06P 1/382; D06P 3/66
[52] U.S. Cl. ................................... 260/153; 260/156; 260/160; 260/176; 260/186; 260/187; 260/190; 260/191
[58] Field of Search ............................. 260/153

[56] References Cited

U.S. PATENT DOCUMENTS

| | | | |
|---|---|---|---|
| 3,218,310 | 11/1965 | Benz et al. | 260/154 |
| 3,418,308 | 12/1968 | Ischer et al. | 260/154 |
| 3,462,410 | 8/1969 | Schneider | 260/153 |
| 4,049,704 | 9/1977 | Jager | 260/153 X |
| 4,122,079 | 10/1978 | Schundehutte | 260/153 |

Primary Examiner—Floyd D. Higel
Attorney, Agent, or Firm—Sughrue, Mion, Zinn, Macpeak & Seas

[57] ABSTRACT

Reactive disazo dyes for dyeing cellulose-containing fibers, represented by the general formula (I):

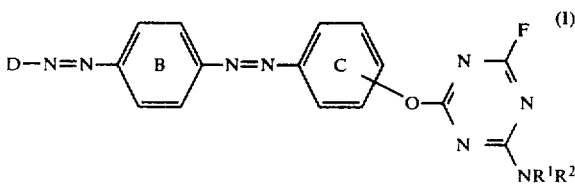

wherein

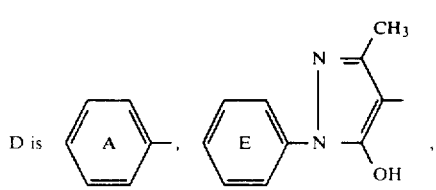

-continued

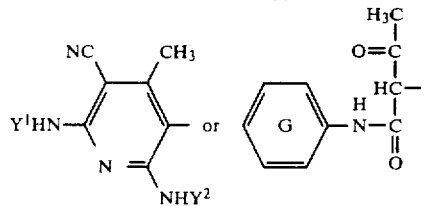

wherein

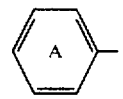

is a phenyl group which may be substituted; $Y^1$ is a phenyl group which may be substituted; $Y^2$ is an allyl group, a benzyl group, or an alkyl group which may be substituted;

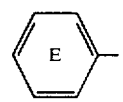

is a phenyl group which may be substituted; and

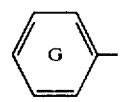

is a phenyl group which may be substituted,

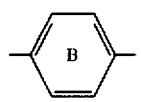

is a naphthylene group, or a phenylene group which may be substituted,

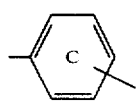

is a phenylene group which may be substituted, and $R^1$ and $R^2$ are each a hydrogen atom, an alkyl group which may be substituted by a cyano group, a hydroxy group, a lower alkoxy group, or a dialkylamino group, or may combine together in combination with N to form a 5- or 6- membered nitrogen-containing heterocyclic ring, the total number of carbon atoms of $R^1$ and $R^2$ being 18 or less.

2 Claims, No Drawings

REACTIVE DISAZO DYES CONTAINING AN OXY FLUORO TRIAZINE GROUP FOR CELLULOSE CONTAINING FIBERS

FIELD OF THE INVENTION

The present invention relates to azo dyes for cellulose-containing fibers, and more particularly, to reactive disazo dyes for dyeing of cellulose-containing fibers, particularly cellulose fibers and polyester-cellulose mixed fibers in from yellow to red having excellent fastness to light, etc.

SUMMARY OF THE INVENTION

The present invention relates to reactive disazo dyes represented by the general formula (I):

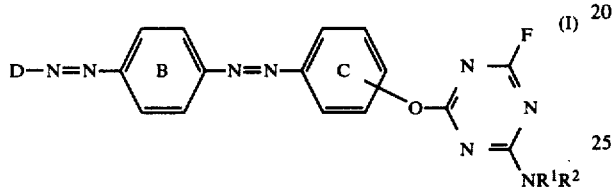

wherein

D is 
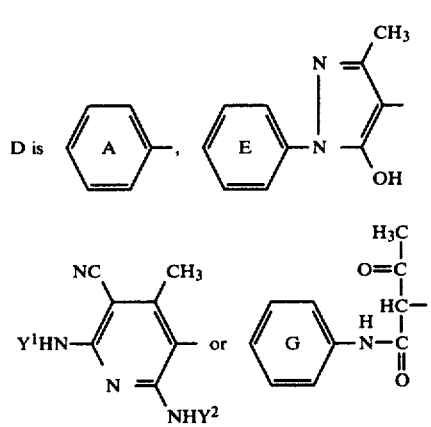

(wherein

is a phenyl group which may be substituted by a lower alkyl group, a lower alkoxy group, a phenoxy group, a nitro group, a cyano group, a halogen atom, a trifluoromethyl group, an acetylamino group, an aminocarbonyl group which may be substituted by a lower alkyl group, an aminosulfonyl group which may be substituted by a lower alkyl group, a lower alkylcarbonyl group, or a lower alkylsulfonyl group; $Y^1$ is a phenyl group which may be substituted by a halogen atom, a trifluoromethyl group, a lower alkyl group, or a lower alkoxy group, or $Y^2$; $Y^2$ is an allyl group, a benzyl group, or an alkyl group which may be substituted by a hydroxy group or a lower alkoxy group;

is a phenyl group which may be substituted by a halogen atom, a sulfamoyl group, or a lower alkylsulfamoyl group; and

is a phenyl group which may be substituted by a halogen atom, a lower alkyl group, or a lower alkoxy group),

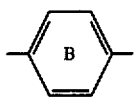

is a naphthylene group, or a phenylene group which may be substituted by a lower alkyl group, a lower alkoxy group, a halogen atom, or an acetylamino group,

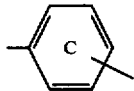

is a phenylene group which may be substituted by a halogen atom, a trifluoromethyl group, a lower alkyl group, or a lower alkoxy group, and $R^1$ and $R^2$ are each a hydrogen atom, an alkyl group which may be substituted by a cyano group, a hydroxy group, a lower alkoxy group, or a dialkylamino group, or may combine together in combination with N to form a 5- or 6-membered nitrogen-containing heterocyclic ring, the total number of carbon atoms of $R^1$ and $R^2$ being 18 or less.

DETAILED DESCRIPTION OF THE INVENTION

Lower alkyl groups which are substituents for

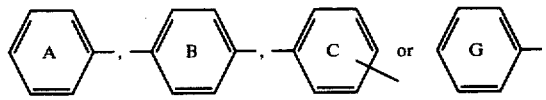

in the general formula (I) include a methyl group, an ethyl group, and a straight or branched alkyl group containing 3 or 4 carbon atoms. Lower alkoxy groups include a methoxy group, an ethoxy group, and an alkoxy group containing 3 or 4 carbon atoms.

Halogen atoms which are substituents for

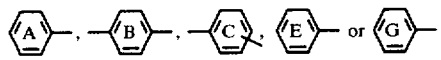

include a fluorine atom, a chlorine atom, and a bromine atom.

Aminocarbonyl groups substituted by a lower alkyl group, which are substituents for

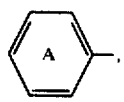

include a methylaminocarbonyl group, an ethylaminocarbonyl group, an isopropylaminocarbonyl group, an n-propylaminocarbonyl group, an n-butylaminocarbonyl group, a dimethylaminocarbonyl group, a diethylaminocarbonyl group, and a di-n-propylaminocarbonyl group. Aminosulfonyl groups substituted by a lower alkyl group include a methylaminosulfonyl group, an ethylaminosulfonyl group, an isopropylaminosulfonyl group, an n-propylaminosulfonyl group, an n-butylaminosulfonyl group, a dimethylaminosulfonyl group, a diethylaminosulfonyl group, or a di-n-propylaminosulfonyl group. Lower alkylcarbonyl groups include a methylcarbonyl group, an ethylcarbonyl group, an n-propylcarbonyl group, and an n-butylcarbonyl group. Lower alkylsulfonyl groups include a methylsulfonyl group, an ethylsulfonyl group, an n-propylsulfonyl group, and an n-butylsulfonyl group.

Alkyl groups represented by $R^1$ and $R^2$ in the general formula (I) include a methyl group, an ethyl group, and a straight or branched alkyl group containing from 3 to 18 carbon atoms. Substituted alkyl groups include cyano group-, hydroxyl group-, lower alkoxy group- or dialkylamino group-substituted alkyl groups, such as a cyanomethyl group, a 2-cyanoethyl group, a 3-cyanopropyl group, a 2-hydroxyethyl group, a 2-hydroxypropyl group, a 3-hydroxypropyl group, a 4-hydroxybutyl group, a 2-(2-hydroxyethoxy)ethyl group, a tris(hydroxymethyl)methyl group, a 2-ethoxyethyl group, a 3-isopropoxypropyl group, a 3-(2-methoxyethoxy)propyl group, a 2,2-diethoxyethyl group, a 2-(N,N-diethylamino)ethyl group, a 2-(N,N-dimethylamino)ethyl group, and a 3-(N,N-dimethylamino)propyl group.

Alkenyl groups include an allyl group, a 2-methylallyl group, a 3-methylallyl group, and a straight or branched alkenyl group containing from 4 to 18 carbon atoms. Substituted alkenyl groups include cyano group-, hydroxy group-, or lower alkoxy group-substituted alkenyl groups, such as a 3-cyanoallyl group, a 2-hydroxyallyl group, a 3-methoxyethoxyallyl group, and a 1-methyl-3-(N,N-diethylamino)allyl group.

Aryl groups include a phenyl group, a naphthyl group, an o-tolyl group, and a p-butylphenyl group. Cyano group-, hydroxyl group-, lower alkoxy group-, or dialkylamino group-substituted aryl groups include an m-cyanophenyl group, a p-hydroxyphenyl group, a p-methoxyphenyl group, a p-(2-methoxyethoxy)phenyl group, a 2,5-dimethoxyphenyl group, and a p-(N,N-dimethylamino)phenyl group.

Aralkyl groups include a benzyl group, a phenethyl group, an m-methylbenzyl group, and a p-methylphenethyl group. Substituted aralkyl groups include an m-cyanobenzyl group, a p-hydroxybenzyl group, a p-hydroxyphenethyl group, and an o-anisil group.

Nitrogen-containing heterocyclic groups represented by $NR^1R^2$ include a 1-pyrrolidinyl group, a 3-methyl-1-pyrrolidinyl group, a 2-hydroxyethyl-1-pyrrolidinyl group, a 2,5-dimethyl-1-pyrrolidinyl group, a 3-thiazolidinyl group, a 1-pyrrolinyl group, a 1-pyrazolyl group, a 1-imidazolyl group, a morpholino group, a piperidino group, a 2,6-dimethylpiperidino group, a 1-piperazinyl group, and a 4-methyl-1-piperazinyl group.

It is particularly preferred that the total number of carbon atoms of $R^1$ and $R^2$ is from 6 to 12 and $NR^1R^2$ is a di-substituted amino group.

The dyes represented by the general formula (I) as described hereinbefore can be easily prepared by reacting diazo compounds represented by the general formula (IX):

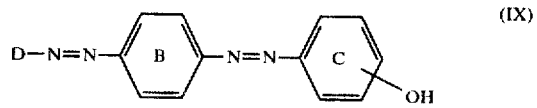

(wherein D,

are the same as described hereinbefore) with, for example, compounds represented by the general formula (X):

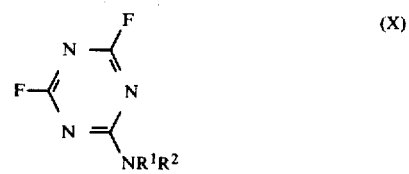

(wherein $R^1$ and $R^2$ are the same as described hereinbefore). For example, a disazo compound represented by the general formula (IX) is reacted with from 1 to 1.2 moles per mole of the disazo compound of a difluorotriazine compound represented by the general formula (X) by heating them at a temperature of from room temperature to 90° C. for 0.4 to 5 hours in an organic solvent, e.g., acetone, methyl ethyl ketone, toluene, nitrobenzene, dioxane, N,N-dimethylformamide, N-methyl-2-pyrrolidone, or dimethyl sulfoxide, in the presence as an acid binding agent of from 1 to 2 moles per mole of the disazo compound of a tertiary amine, e.g., triethylamine, tributylamine, or N,N-diethylaniline, or an inorganic base, e.g., potassium carbonate or potassium hydrogencarbonate. The resulting reaction solution is cooled and poured into a, for example, water. By separating the precipitate thus formed by techniques such as filtration and centrifugal separation, there can be almost quantitatively obtained a disazo dye represented by the general formula (I).

Cellulose-containing fibers which are dyed using the dyes of the invention include fibers such as natural fibers, e.g., cotton and jute, semi-synthetic fibers, e.g., viscose rayon and copper ammonia rayon, and partially aminated or acylated cellulose fibers, and their woven and unwoven fabrics, and so forth. In addition, mixed fibers of the above-described fibers and other fibers, such as polyester fibers, cation dyeable polyester fibers, anion dyeable polyester fibers, polyamide fibers, wool, acryl fibers, urethane fibers, diacetate fibers, and triacetate fibers, and their fabrics can be used. Of these fibers, cellulose fibers and mixed fibers of cellulose fibers and polyester fibers, and their fabrics are particularly suitable for dyeing with the dyes of the invention.

In the practice of dyeing, it is desirable for the dyes represented by the general formula (I) to be finely dispersed in a medium to the extent that the resulting particle size is from 0.5 to 2μ. This can be achieved by various techniques such as a method in which a water-soluble dispersant, such as a nonionic surface active agent, e.g., a Pluronic surface active agent, or an anionic dispersant, e.g., sodium ligninsulfonate or a sodium salt of a naphthalenesulfonic acid-formalin condensate, is employed and the dyes are finely dispersed in water by the use of a grinder, such as a sand grinder and a mill; a method in which a water sparingly soluble or water insoluble dispersant, such as a compound prepared by adding a lower molar amount of ethylene oxide to sulfosuccinic acid ester, nonylphenol or the like, is employed, and the dyes are finely dispersed in a solvent other than water, such as alcohols, e.g., ethyl alcohol, isopropyl alcohol, and polyethylene glycol, ketones, e.g., acetone and methyl ethyl ketone, hydrocarbons, e.g., n-hexane, toluene, xylene, and mineral turpentine, halogenated hydrocarbons, e.g., tetrachloroethylene, esters, e.g., ethyl acetate and butyl acetate, ethers, e.g., dioxane, and tetraethylene glycol dimethyl ether, and their mixtures; and a method in which the dyes are finely dispersed in a mixed solvent of water and a solvent compatible in water in any proportion, selected from the above-described solvents.

This fine dye dispersion can be used as such as a padding bath for use in a padding dyeing method, or as a printing color paste for use in a printing method. In practical use, however, the fine dye dispersion is usually diluted with water, a mixed solvent of water and a solvent compatible with water in any proportions, or an o/w type or w/o type emulsion in which the oil phase is a petroleum hydrocarbon, such as mineral turpentine, or a halogenated hydrocarbon, such as tetrachloroethylene, to a level determined depending on the desired dyeing concentration.

In the preparation of such padding baths or printing color pastes, a cellulose fiber-swelling agent may be added in order to perform dyeing advantageously, or an alkali metallic compound, an organic epoxy compound, an organic vinyl compound or the like may be added as an acid coupler for the purpose of accelerating the reaction between the dye and cellulose fiber.

Alkali metallic compounds which can be used include alkali metal carbonic acid salts and, in addition, alkali metal hydrocarbonic acid salts, alkali metal phosphoric acid salts, alkali metal boric acid salts, alkali metal silicic acid salts, alkali metal hydroxides, alkali metal aliphatic acid salts, e.g., alkali metal acetic acid salts, and alkali precursors, such as sodium trichloroacetate and sodium acetoacetate, which liberate alkalis on heating in the presence of water. The amount of the alkali metallic compound being used is usually sufficient to be such that the pH of the padding bath or printing color paste is from 7.5 to 8.6.

Organic epoxy compounds which can be used include ethylene glycol diglycidyl ether and polyethylene glycol diglycidyl ether having an average molecular weight of from 150 to 400. Organic vinyl compounds which can be used include ethylene glycol diacrylate, and polyethylene glycol diacrylate or dimethacrylate having an average molecular weight of from 150 to 400. The amount of the organic epoxy compound or organic vinyl compound being used is from about 3 to 6% by weight based on the padding bath or printing color paste.

In order to prevent dry migration in the course of padding dyeing, or to regulate the color paste viscosity to the optimum level in various printing methods, a tackifier such as a water soluble polymer, e.g., sodium alginate, may be added.

The preparation of the padding bath or printing color paste is not limited to the above described method. Also, it is not always required for the cellulose swelling agent and acid binding agent to be present in the padding bath or printing color paste, and they may be added to fibers in advance.

Any cellulose fiber-swelling agents can be used in the invention as long as they have a boiling point of at least 150° C. and have the effect of swelling cellulose fibers. Examples are ureas such as N,N,N',N'-tetramethylurea, polyhydric alcohols such as polyethylene glycol and polypropylene glycol, and their derivatives. Of these compounds, polyhydric alcohol derivatives which are prepared by dimethylating or diacetylating both terminal hydroxy groups of polyethylene glycol, polypropylene glycol, etc., having an average molecular weight of from about 200 to 500, and which are inactive with the reactive groups of dyes are particularly preferred to use as cellulose fiber-swelling agents.

The amount of the cellulose fiber-swelling agent being used is preferably from about 5 to 25% by weight, preferably from about 8 to 15% by weight, based on the padding bath or printing color paste.

The above-described cellulose-containing fibers are dyed using the dyes of the invention in the usual manner. For example, a cellulose-containing fiber material is impregnated or printed with a padding bath or printing color paste as prepared by the above-described method and dried and, thereafter, it is heat-treated with hot air or super heated steam maintained at 160° to 220° C. for 30 seconds to 10 minutes, or treated with high pressure saturated steam maintained at 120° to 150° C. for 3 to 30 minutes and then washed with hot water, or an o/w type or w/o type emulsion washing bath in which the oil phase is a halogenated hydrocarbon, such as tetrachloroethylene, or washed by the usual dry cleaning procedure.

In accordance with the above-described method, there can be obtained a dyed product which is sharp in color and uniformly dyed, and which has good light fastness and moisture fastness.

The following examples are given to illustrate the invention in greater detail. All parts are by weight.

EXAMPLE 1

A dye composition consisting of 15 parts of disazo dye represented by the following formula:

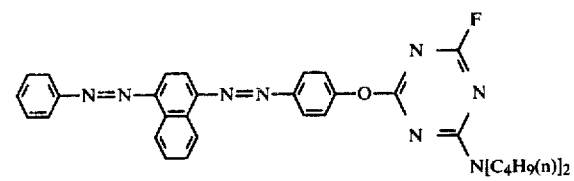

15 parts of a naphthalenesulfonic acid-formaldehyde condensate, and 70 parts of water was processed by the use of a paint shaker as a finely dispersing apparatus to prepare a dye dispersion. This dye dispersion was used to prepare a printing color paste having the following composition:

EXAMPLE 2

A dye composition consisting of 15 parts of disazo dye represented by the following formula:

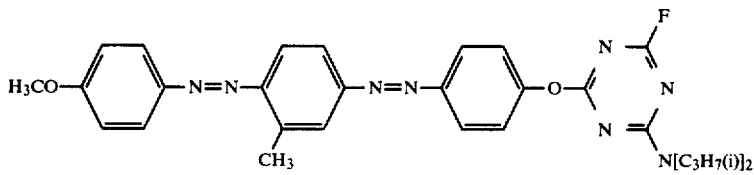

10 parts of a Pluronic surface active agent, Pluronic L 64 (trade name, produced by Asahi Denka Kogyo Co., Ltd.), and 75 parts of water was processed by the use of a sand grinder as a finely dispersing apparatus to prepare a dye dispersion. This dye dispersion was used to prepare a printing color paste having the following composition:

|  | parts |
| --- | --- |
| Dye dispersion | 6.5 |
| 5% Aqueous solution of sodium alginate | 55 |
| Polyethylene glycol dimethyl ether | 9 |
| Water | 29.5 |
|  | 100 |
|  | (pH: 8.0) |

The printing color paste thus prepared was printed on a polyester/cotton mixed cloth (mixing ratio: 65/35) by the use of a screen printing machine, was subjected to preliminarily drying at 80° C. for 3 minutes, and then was fixed by dry heating at 215° C. for 90 seconds. After washing with water, the cloth was subjected to soaping using a washing solution containing 2 g/l of a nonionic surface active agent (Scourol #900 (trade name), produced by Kao Soap Co., Ltd.) at a bath ratio of 1:30 at a temperature of 80° C. for 20 minutes, and there was thus obtained a yellow brown dyed product having excellent light fastness and wet color fastness.

The dye used in this example was prepared as follows:

In a mixture of 50 ml of N-methyl-2-pyrrolidone and 1.5 g of triethylamine was dissolved 3.52 g of dye represented by the formula:

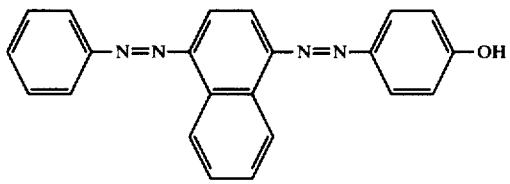

and 2.6 g of 2,4-difluoro-6-di(n-butyl)aminotriazine was then added thereto. The resulting mixture was stirred at room temperature for 2 hours to achieve a condensation reaction. The reaction solution was poured into 500 ml of water, and the precipitate thus obtained was separated by filtration, washed with water, and then dried at room temperature by the use of a vacuum dryer. There was thus obtained 5.5 g of an ocher powder of the dye represented by the above-described formula. For this dye, $\lambda_{max}$ (acetone) was 414 nm.

|  | parts |
| --- | --- |
| Dye dispersion | 7 |
| 5% Aqueous solution of sodium alginate | 55 |
| Diacetate of polypropylene glycol having an average molecular weight of 300 | 10 |
| Polyethylene glycol diglycidyl ether | 3 |
| Water | 25 |
|  | 100 |
|  | (pH: 6.5) |

The thus prepared printing color paste was printed on a cotton broad (cotton yarn number: 40) which had been subjected to a silket processing, by the use of a screen printing machine, was subjected to preliminarily drying at 80° C. for 3 minutes, and then treated with super heated steam at 185° C. for 7 minutes. Thereafter, a washing treatment was performed in the same manner as described in Example 1, and there was thus obtained a yellow dyed product having excellent light fastness and wet color fastness.

The dye used in this example was prepared as follows:

A dye represented by the formula:

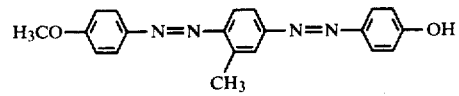

was reacted with 2,4-difluoro-6-diisopropylaminotriazine at room temperature in dimethyl sulfoxide by the use of tri-n-butylamine as an acid binding agent to obtain the dye represented by the above-described formula. For this dye, $\lambda_{max}$ (acetone) was 383 nm.

EXAMPLE 3

A dye composition consisting of 10 parts of disazo dye represented by the formula:

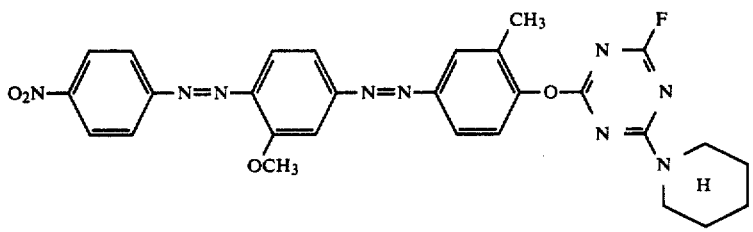

2 parts of polyoxyethylene glycol nonylphenyl ether (HLB: 8.9), and 88 parts of diethylene glycol diacetate was ground by the use of a paint conditioner as a finely dispersing apparatus to prepare a dye ink.

A mixture of 10 parts of the dye ink and 55 parts of mineral turpentine was gradually poured into 35 parts of an aqueous solution having the composition as described hereinafter while stirring with a homomixer at a rate of 5,000 to 7,000 rpm until it became uniform to prepare a viscous o/w type emulsion color paste.

| Composition of Aqueous Solution | parts |
| --- | --- |
| Water | 31 |
| Repitol G (special nonionic surface active agent (trade name), produced by Dai-ichi Kogyo Seiyaku Co., Ltd.) | 3.8 |
| Sodium trichloroacetate | 0.1 |
| | 34.9 |

The thus prepared color paste was printed on a polyester/cotton mixed cloth (mixing ratio: 65/35) by the use of a screen printing machine, dried at 100° C. for 2 minutes, and then treated with super heated steam at 175° C. for 7 minutes. Thereafter, the cloth was washed with a heated tetrachloroethylene bath containing a small amount of water and dried, and there was thus obtained a yellow brown dyed product which had excellent light fastness and wet color fastness, and which was not stained in the white background.

The dye used in this example was prepared as follows:

A dye represented by the formula:

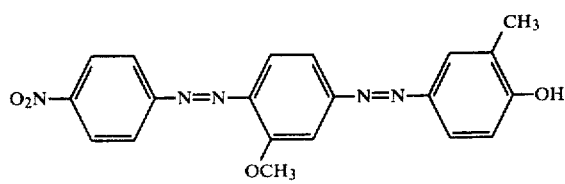

was reacted with 2,4-difluoro-6-piperidinyltriazine in methyl ethyl ketone by the use of potassium carbonate as an acid binding agent to obtain the desired dye. For this dye, $\lambda_{max}$ (acetone) was 404 nm.

EXAMPLE 4

A dye composition consisting of 16 parts of disazo dye represented by the formula:

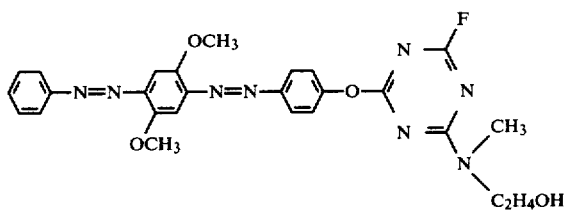

7 parts of polyoxyethylene glycol nonylphenyl ether (HLB: 13.3), 3 parts of a naphthalenesulfonic acidformaldehyde condensate, and 74 parts of water was finely dispersed by the use of a sand grinder to prepare a dye dispersion. This dye dispersion was used to prepare a padding bath having the following composition:

| | parts |
| --- | --- |
| Dye dispersion | 6 |
| Tetraethylene glycol dimethyl ether | 15 |
| Water | 79 |
| | 100 |
| | (pH: 8.0) |

A polyester/cotton mixed cloth (mixing ratio: 65/35) was impregnated with the above prepared padding bath and squeezed at a squeezing ratio of 45% and, thereafter, was dried at 100° C. for 2 minutes and fixed by drying heating at 200° C. for 1 minute. The cloth was then washed with a heated ethanol bath, and there was thus obtained a reddish yellow dyed product having excellent light fastness and wet color fastness.

The dye used in this example was prepared in the same manner as described in Example 1. For this dye, $\lambda_{max}$ (acetone) was 460 nm.

EXAMPLE 5

Printing was performed in the same manner as in Example 1 except that a nylon/rayon mixed cloth (mixing ratio: 50/50) was used and the dry heating fixing temperature was 185° C. There was obtained a yellow brown dyed product having good light fastness and wet color fastness.

EXAMPLE 6

Using a series of disazo dyes shown in Table 1, the same printing as described in Example 1 was performed. With all the dyed clothes, light fastness and wet color fastness were good. The color of each dyed cloth and $\lambda_{max}$ (acetone) of each dye used are shown in Tables 1 to 4.

TABLE 1

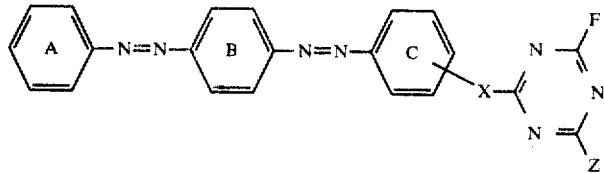

| No. | A | B | C | —X— | —Z | Hue of Dyed Cloth | $\lambda_{max}$ (acetone) (nm) |
|---|---|---|---|---|---|---|---|
| 1 | phenyl | 2,5-dimethyl-4-methoxyphenyl | 4-methylphenyl | —O— | —N(C$_4$H$_9$)$_2$(n) | yellowish brown | 405 |
| 2 | " | " | 3,4-dimethylphenyl | " | —N(C$_6$H$_{13}$)$_2$(n) | yellowish brown | 407 |
| 3 | " | " | 3-methoxy-4-methylphenyl | " | —N(C$_3$H$_7$)$_2$(i) | yellowish brown | 408 |
| 4 | " | " | 3-methyl-4-n-butoxyphenyl | " | —N(C$_2$H$_4$OC$_2$H$_4$OCH$_3$)$_2$ | yellowish brown | 409 |
| 5 | " | " | " | " | —N(C$_6$H$_{11}$)$_2$ | yellowish brown | 409 |
| 6 | " | " | 3,4-dimethylphenyl | " | —NH—CH$_2$—(3-methylphenyl) | yellowish brown | 398 |
| 7 | " | " | 4-methylphenyl | —S— | —NHC$_{18}$H$_{37}$(n) | yellowish brown | 405 |
| 8 | " | 4-methylphenyl | naphthyl | —O— | —N(C$_5$H$_{11}$)$_2$(n) | orange | 401 |
| 9 | " | " | " | " | —N(CH$_3$)(C$_3$H$_6$N(C$_2$H$_5$)$_2$) | " | 401 |
| 10 | " | 2,5-diethylphenyl | 2-ethoxy-5-methylphenyl | " | —N(C$_2$H$_4$OH)$_2$ | yellow | 385 |
| 11 | " | " | dimethylnaphthyl | " | 2,5-dimethylpyrrolidinyl | orange | 402 |

TABLE 1-continued

Structure: A—N=N—B—N=N—C—X—[triazine with F, N, N, Z substituents]

| No. | Ⓐ | Ⓑ | Ⓒ | —X— | —Z | Hue of Dyed Cloth | λ_max (acetone) (nm) |
|---|---|---|---|---|---|---|---|
| 12 | " | " | " | " | —N(pyrrolidine ring) | " | 403 |
| 13 | " | 2,5-di(OCH₃)-phenyl | 2,4-di(CH₃)-phenyl | " | —N(C₅H₁₁)₂(i) | reddish yellow | 451 |
| 14 | " | " | 2,4-di(CH₃)-phenyl | " | —N(C₄H₉)₂(sec) | reddish yellow | 463 |
| 15 | " | " | " | " | —N(H)(C₁₄H₂₉(sec)) | reddish yellow | 461 |
| 16 | " | " | " | " | —N(H)((CH₂)₈CH=CH(CH₂)₇CH₃) | reddish yellow | 461 |
| 17 | NO₂—phenyl | phenyl | 2,4-di(CH₃)-phenyl | —S— | —N(morpholine) | yellowish brown | 402 |
| 18 | " | " | 4-CH₃-phenyl | —O— | —N(CH₃)(CH₂CH₂—C₆H₄—CH₃) | yellowish brown | 406 |
| 19 | CH₃CON(H)—phenyl | 2,5-di(CH₃)-4-OCH₃-phenyl | " | " | —NH₂ | yellowish brown | 407 |
| 20 | " | " | " | " | —N(CH₂—phenyl)₂ | yellowish brown | 408 |
| 21 | 2-CN-phenyl | " | " | " | —N(C₂H₄OCH₃)(C₂H₄CN) | yellowish brown | 408 |
| 22 | 3-CF₃-phenyl | " | " | " | —N(CH₃)₂ | yellowish brown | 407 |

TABLE 1-continued

[Structure: A—N=N—B—N=N—C—X—C(=N-)N=C(F)—N=C(Z), triazine ring with F and Z substituents]

| No. | A | B | C | —X— | —Z | Hue of Dyed Cloth | λmax (acetone) (nm) |
|---|---|---|---|---|---|---|---|
| 23 | (t)H₉C₄O— | " | " | " | —NH—(2,5-dimethoxyphenyl) (OCH₃ at 2, H₃CO at 5) | yellowish brown | 419 |
| 24 | 4-(N(CH₃)₂SO₂)C₆H₄— (N,N-dimethylsulfamoyl, NO₂S with two CH₃) | " | " | " | —N(C₅H₁₁)₂(i) | yellowish brown | 410 |
| 25 | " | " | " | " | —N(C₃H₇)₂(i) | yellowish brown | 410 |
| 26 | 3-Cl-4-(CH₃O₂S)C₆H₃— | " | " | " | —NHC₃H₇(i) | yellowish brown | 413 |
| 27 | " | " | " | " | —N(piperazinyl)—N—CH₃ | yellowish brown | 412 |
| 28 | 3-Br-C₆H₄— | 2-OC₄H₉(n)-phenyl | 2-phenoxyphenyl | " | —N(CH₃)₂ | yellowish brown | 409 |
| 29 | " | " | 4-methylphenyl | " | —N(C₆H₅)₂ | yellowish brown | 405 |
| 30 | 2,4-dichlorophenyl | 2,5-di(C₃H₇(n))phenyl | " | " | —NH—(3-cyanophenyl) | yellowish brown | 409 |
| 31 | " | " | " | " | —NH—cyclohexyl | yellowish brown | 409 |
| 32 | 4-(CH₃CONH)C₆H₄— | 2-Cl-phenyl | " | " | —N(C₃H₇)₂(i) | yellowish brown | 407 |
| 33 | " | 2-Br-phenyl | " | " | —NH—(4-hydroxyphenyl) | yellowish brown | 406 |
| 34 | 4-(C₃H₇CO(n))C₆H₄— | 2,4-di(CH₃)phenyl | " | " | —N(CH₃)(C₆H₅) | yellowish brown | 407 |

TABLE 1-continued

A—N=N—B—N=N—C—X—[triazine with F, Z]

| No. | A | B | C | —X— | —Z | Hue of Dyed Cloth | λ_max (acetone) (nm) |
|---|---|---|---|---|---|---|---|
| 35 | " | " | " | " | —NH—C$_6$H$_{13}$(n) | yellowish brown | 407 |
| 36 | C$_2$H$_5$—(Cl)phenyl— | " | naphthyl | —S— | —N(C$_2$H$_4$CN)$_2$ | orange | 402 |
| 37 | " | " | phenyl | —O— | —N(CH$_2$CH$_2$CH$_2$OH)(CH$_2$phenyl) | yellowish brown | 405 |
| 38 | phenyl-O-phenyl— | " | " | " | piperazine-N—C$_2$H$_4$OH | yellow | 386 |
| 39 | " | " | " | " | —N(C$_3$H$_7$)$_2$(i) | " | 386 |
| 40 | " | 2,4-(CH$_3$)phenyl | " | " | —NH—C$_3$H$_6$CN | " | 387 |
| 41 | " | " | " | " | —N(C$_2$H$_4$OCH$_3$)$_2$ | " | 387 |
| 42 | phenyl | naphthyl | " | " | —N(CH$_2$—CH=CH$_2$)$_2$ | yellowish brown | 414 |
| 43 | " | " | " | " | —N(C$_4$H$_9$)$_2$(sec) | yellowish brown | 414 |
| 44 | " | " | " | " | —NH—CH$_2$—C(CH$_3$)=CH—OH | yellowish brown | 415 |
| 45 | " | " | 3,4-(CH$_3$)phenyl | " | —N(C$_3$H$_7$)$_2$(i) | yellowish brown | 411 |
| 46 | " | " | " | " | —NH—C$_7$H$_{15}$(n) | yellowish brown | 412 |
| 47 | " | " | naphthyl | " | —NH—C$_2$H$_5$ | yellowish brown | 422 |

TABLE 1-continued

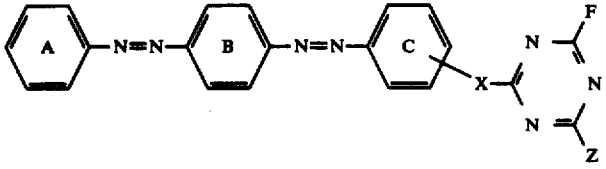

| No. | A | B | C | —X— | —Z | Hue of Dyed Cloth | λmax (acetone) (nm) |
|---|---|---|---|---|---|---|---|
| 48 | 3-Cl-C6H4— | " | 4-CH3-C6H4— | " | —N(C2H5)(C2H4N(C2H5)2) | yellowish brown | 418 |
| 49 | C6H5— | 4-NHCOCH3-C6H4— | " | " | —N(C4H9)2(n) | yellowish brown | 406 |
| 50 | " | 2-OCH3-5-NHCOCH3-C6H3— | " | " | " | reddish yellow | 449 |

TABLE 2

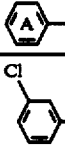

| No. | A | B | C | —NR¹R² | Hue of Dyed Cloth | λmax (acetone) (nm) |
|---|---|---|---|---|---|---|
| 1 | C6H5— | 2-OCH3-C6H4— | 4-CH3-C6H4— | —NHC5H11(i) | yellowish brown | 404 |
| 2 | C6H5— | 2-OCH3-5-CH3-C6H3— | 4-CH3-C6H4— | —N(C3H6OH)(C3H6CN) | yellowish brown | 405 |
| 3 | C6H5— | 2-Cl-C6H4— | 4-CH3-C6H4— | morpholino | yellowish brown | 408 |
| 4 | C6H5— | 2,4-Br2-C6H3— | 4-CH3-C6H4— | —NHC18H37(n) | yellowish brown | 410 |

TABLE 2-continued

Structure: A−N=N−B−N=N−C−O−C(=N−)−N=C(F)−N, with −NR¹R² substituent on triazine

| No. | A | B | C | −NR¹R² | Hue of Dyed Cloth | λ_max (acetone) (nm) |
|---|---|---|---|---|---|---|
| 5 | 4-O₂N-phenyl | 2-OCH₃-phenyl | 2-CH₃-phenyl | −N(C₇H₁₅(n))₂ | yellowish brown | 412 |
| 6 | 4-(H₅C₂)₂NO₂S-phenyl | 2-OCH₃-phenyl | 2-Cl-phenyl | 2-methylpyrrolidinyl (−N(CH₃)(CH₂)₃−) | yellowish brown | 405 |
| 7 | 4-(i-H₇C₃)HNO₂S-phenyl | 3-CH₃-phenyl | 2-OCH₃-phenyl | −NH-cyclohexyl | yellowish brown | 410 |
| 8 | 4-Cl-phenyl | 2-CH₃-phenyl | 2-OCH₃-phenyl | −N(piperazinyl)N−C₂H₄OH | yellowish brown | 408 |

TABLE 3

Structure: pyrazolone (E−N, CH₃, OH) −N=N−B−N=N−C−O−C(=N−)−N=C(F)−N, with −NR¹R²

| No. | E | B | C | −NR¹R² | Hue of Dyed Cloth | λ_max (acetone) (nm) |
|---|---|---|---|---|---|---|
| 1 | phenyl | 2-Cl-phenyl | phenyl | −N[C₄H₉(i)]₂ | orange | 419 |
| 2 | 3-Cl-phenyl | 3-Cl-phenyl | phenyl | −N[C₂H₄N(CH₃)₂]₂ | orange | 416 |

TABLE 3-continued

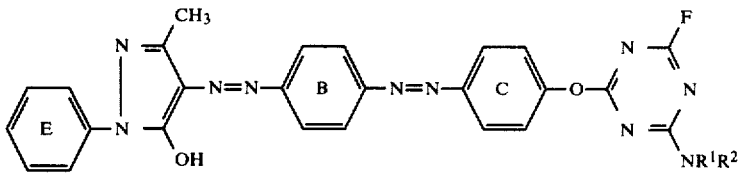

| No. | E | B | C | —NR¹R² | Hue of Dyed Cloth | $\lambda_{max}$ (acetone) (nm) |
|---|---|---|---|---|---|---|
| 3 | phenyl | 2-F-phenyl | 2-CH₃-phenyl | —N(CH₂CH₂)₂NH (piperazine) | orange | 419 |
| 4 | 3-SO₂N(C₄H₉)₂-phenyl | 2-CH₃,5-Cl-phenyl | 2-Cl-phenyl | —N(CH₂CH₂)₂O (morpholine) | orange | 421 |
| 5 | phenyl | 2,4-Br₂-phenyl | phenyl | —N[C₃H₇(n)]₂ | orange | 418 |

TABLE 4

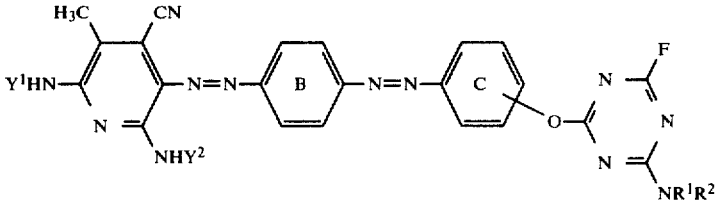

| No. | —NHY¹ | —NHY² | B | C | —NR¹R² | Hue of Dyed Cloth | $\lambda_{max}$ (acetone) (nm) |
|---|---|---|---|---|---|---|---|
| 1 | —NHC₃H₆OCH₃ | —NHC₃H₆OCH₃ | naphthyl | 3-CH₃-phenyl | —N[C₄H₉(n)]₂ | rubine | 523 |
| 2 | —NHC₂H₄OC₂H₅ | —NHC₂H₄OC₂H₅ | naphthyl | 2-Cl,5-CH₃-phenyl | —N[C₄H₉(n)]₂ | rubine | 526 |

TABLE 4-continued

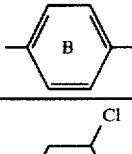

| No. | —NHY¹ | —NHY² | B | C | —NR¹R² | Hue of Dyed Cloth | $\lambda_{max}$ (acetone) (nm) |
|---|---|---|---|---|---|---|---|
| 3 | —NH—⟨C₆H₄⟩ | —NHC₂H₄OH | ⟨C₆H₃-Cl⟩ | ⟨C₆H₄⟩ | —N(C₂H₅)₂ | red | 503 |
| 4 | —NH—⟨C₆H₄-Cl⟩ | —NHC₂H₄OH | ⟨C₆H₃-Br⟩ | ⟨C₆H₄⟩ | —N(CH₃)(C₂H₄N(CH₃)₂) | red | 501 |
| 5 | —NHC₃H₆OH | —NHC₃H₆OH | ⟨C₆H₃(CH₃)(Cl)⟩ | ⟨C₆H₄⟩ | —N(CH₃)(pyrrolidinyl-CH₃,H) | red | 506 |
| 6 | —NHC₂H₄OCH₃ | —NHC₂H₄—⟨C₆H₅⟩ | ⟨C₆H₃Br₂⟩ | ⟨C₆H₄⟩ | —N(C₃H₆OCH₃)(C₃H₆CN) | red | 507 |

EXAMPLE 7

A dye composition consisting of 15 parts of disazo dye represented by the following formula:

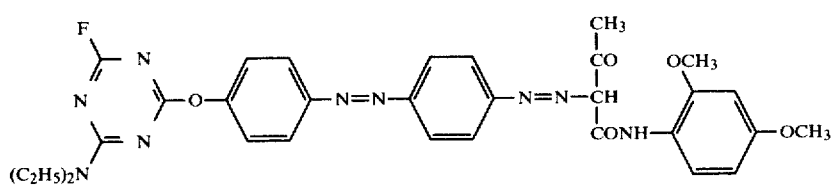

15 parts of a naphthalenesulfonic acid-formaldehyde condensate, and 70 parts of water was processed by the use of a paint shaker as a finely dispersing apparatus to prepare a dye dispersion. This dye dispersion was used to prepare a printing color paste having the following composition:

| | parts |
|---|---|
| Dye dispersion | 6.5 |
| 5% Aqueous solution of sodium alginate | 55 |
| Polyethylene glycol dimethyl ether having an average molecular weight of 400 | 9 |
| Water | 29.5 |
| | 100 (pH: 8.0) |

The printing color paste thus prepared was printed on a polyester/cotton mixed cloth (mixing ratio: 65/35) by the use of a screen printing machine, dried at 80° C. for 3 minutes, and then fixed by dry heating at 215° C. for 90 seconds. After washing with water, the cloth was subjected to soaping using a washing solution containing 2 g/l of a nonionic surface active agent (Scourol #900 (trade name), produced by Kao Soap Co., Ltd.) at a bath ratio of 1:30 and at a temperature of 80° C. for 20 minutes. There was thus obtained an orange dyed product having excellent light fastness and wet color fastness.

The dye used in this example was prepared as follows:

In 50 ml of a 50% by volume aqueous solution of acetic acid was dissolved 2.13 g of 4amino-4'-hydroxyazobenzene, and 3 ml of hydrochloric acid was then added thereto. The resulting mixture was cooled to 5° C. or less, and 0.7 g of sodium nitrite was then added thereto. During this time, the temperature was regulated so as not to exceed 5° C. The thus obtained diazonium salt solution was added to 2.4 g of an aqueous solution of acetoacetic acid-2,4-dimethoxyanilide at a temperature of 5° C. or less while regulating so that the pH was maintained at 10. The disazo compound thus precipitated was separated by filtration, washed with water, and then dried. A mixture of 4.61 g of the above obtained dye, 2.1 g of 2,4-difluoro-6-(diethylamino)triazine, 1.0 g of triethylamine, and 1.0 g of anhydrous potassium carbonate was added to 100 ml of acetone and heated at reflux for 3 hours to achieve a condensation reaction. The reaction solution was added dropwise to 1,000 ml of water, and the thus formed precipitate was separated by filtration, washed with water, and then dried at room temperature. There was thus obtained 6.1 g of dark yellow powder of the dye represented by the above described formula (yield: 92%). For this dye, $\lambda_{max}$ (acetone) was 409 nm.

EXAMPLE 8

A dye composition consisting of 15 pairs of disazo dye represented by the formula:

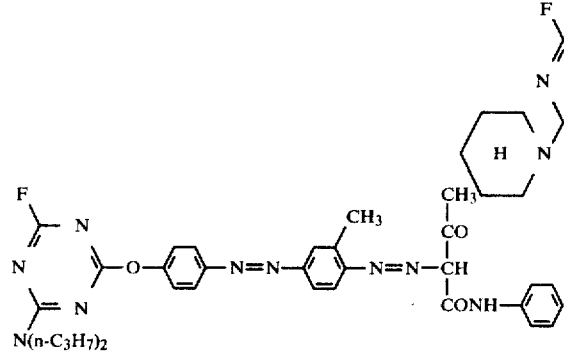

10 parts of Pluronic surface active agent, Pluronic L 64 (trade name, produced by Asahi Denka Kogyo Co., Ltd.), and 75 parts of water was processed by the use of a sand grinder as a finely dispersing apparatus to prepare a dye dispersion. This dye dispersion was used to prepare a printing color paste having the following composition:

| | parts |
|---|---|
| Dye dispersion | 7 |
| 5% Aqueous solution of sodium alginate | 55 |
| Diacetate of polypropylene glycol having an average molecular weight of 300 | 10 |
| Polyethylene glycol diglycidyl ether having an average molecular weight of 200 | 3 |
| Water | 25 |
| | 100 |
| | (pH: 6.5) |

The thus prepared printing color paste was printed on a cotton broad (cotton yarn number: 40) which had been subjected to a silket processing, by the use of a screen printing machine, was subjected to preliminarily drying at 80° C. for 3 minutes, and then was treated using super heated steam at 185° C. for 7 minutes. Thereafter, the same washing treatment as in Example 1 was performed, and there was thus obtained an orange dyed product having excellent light fastness and wet color fastness.

The dye used in this example was prepared as follows:

A dye was prepared by diazonating 4-amino-5-methyl-4'-hydroxyazobenzene and then coupling the resulting diazonated compound to acetoacetic acid anilide in accordance with the method as described in Example 1. The dye thus formed was then reacted with 2,4-difluoro-6-[di(n-propyl)amino]triazine in N-methyl-2-pyrrolidone by the use of triethylamine as an acid-binding agent to obtain the desired dye. For this dye, $\lambda_{max}$ (acetone) was 409 nm.

EXAMPLE 9

A dye composition consisting of 10 parts of disazo dye represented by the formula:

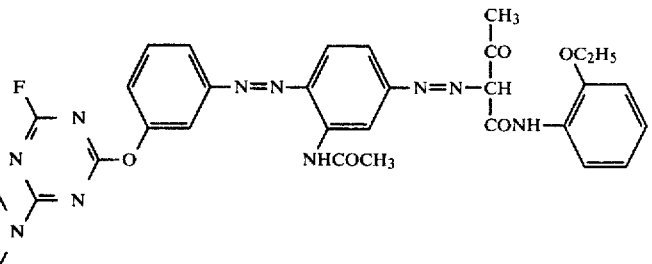

2 parts of polyoxyethylene glycol nonylphenyl ether (HLB: 8.9), and 88 parts of diethylene glycol diacetate was ground by the use of a paint conditioner as a finely dispersing apparatus to prepare a dye ink.

A mixture of 10 parts of the dye ink and 55 parts of mineral turpentine was gradually poured into 35 parts of an aqueous solution having the composition as described hereinafter while stirring with a homomixer at a rate of 5,000 to 7,000 rpm, and the resulting mixture was further stirred until it became uniform to prepare a viscous o/w type emulsion color paste.

| Composition of Aqueous Solution | parts |
|---|---|
| Water | 31 |
| Repitol G (trade name, specific nonionic surface active agent, produced by Dai-ichi Kogyo Seiyaku Co., Ltd.) | 3.8 |
| Sodium trichloroacetate | 0.1 |

| Composition of Aqueous Solution | parts |
|---|---|
| -continued | |
| | 34.9 |

The color paste thus prepared was printed on a polyester/cotton mixed cloth (mixing ratio: 65/35) by the use of a screen printing machine, dried at 100° C. for 2 minutes, and then treated using super heated steam at 175° C. for 7 minutes. Thereafter, the cloth was washed with a heated tetrachloroethylene bath containing a small amount of water and dried, and there was thus obtained an orange dyed product which had excellent light fastness and wet color fastness, and was not stained in the white background.

The dye used in this example was prepared as follows:

2'-Acetylamino-4'-amino-3-hydroxyazobenzene was diazonated and then coupled to acetoacetic acid-2-ethoxyanilide in accordance with the method as described in Example 7 to prepare a dye which was then reacted with 2,4-difluoro-6-piperidinotriazine in accordance with the method as described in Example 7 to prepare the desired dye. For this dye, $\lambda_{max}$ (acetone) was 413 nm.

EXAMPLE 10

A dye composition consisting of 16 parts of disazo dye represented by the formula:

| | parts |
|---|---|
| Dye dispersion | 6 |
| Tetraethylene glycol dimethyl ether | 15 |
| Water | 79 |
| | 100 |
| | (pH: 8.0) |

A polyester/cotton mixed cloth (mixing ratio: 65/35) was impregnated with the above prepared padding bath and squeezed at a squeezing ratio of 45% and, thereafter, it was dried at 100° C. for 2 minutes and fixed by dry heating at 200° C. for 1 minute. The cloth was then washed with a hot ethanol bath, and there was thus obtained an orange dyed product having excellent light fastness and wet color fastness.

The dye used in this example was prepared in accordance with the method as described in Example 7. For this dye, $\lambda_{max}$ (acetone) was 412 nm.

EXAMPLE 11

Printing was performed in the same manner as in Example 7 except that a nylon/rayon mixed cloth (mixing ratio: 50/50) was used, and the dry heating fixing temperature was 185° C. There was thus obtained a reddish orange printed product having good wet color fastness and light fastness.

EXAMPLE 12

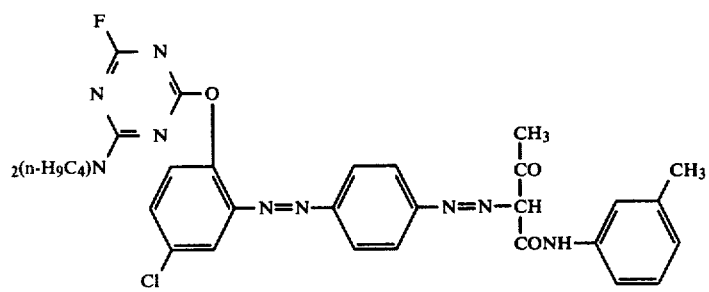

7 parts of polyoxyethylene glycol nonylphenyl ether (HLB: 13.3), 3 parts of a naphthalenesulfonic acidformaldehyde condensate, and 74 parts of water was finely dispersed by the use of a sand grinder as a finely dispersing apparatus to prepare a dye dispersion. The dye dispersion thus prepared was used to prepare a padding bath having the following composition:

Using a series of disazo dyes shown in Tables 5 to 7, printing was performed in the same manner as in Example 7. All the printed products had good light fastness and wet color fastness. The hue of each printed product and $\lambda_{max}$ (acetone) of each dye are shown in Tables 5 to 7.

TABLE

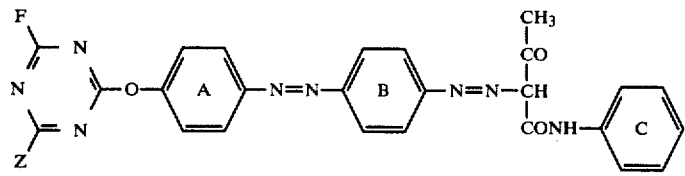

| No. | A | B | C | —Z | Hue of Dyed Cloth | λmax (acetone) (nm) |
|---|---|---|---|---|---|---|
| 1 | 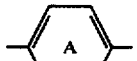 |  |  | $-\text{N}\begin{smallmatrix}\text{H}\\\text{C}_{13}\text{H}_{27}(n)\end{smallmatrix}$ | orange | 409 |
| 2 | " | " | 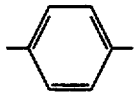 (CH₃) | $-\text{N}\begin{smallmatrix}\text{H}\\\text{CH}_2-\text{Ph}\end{smallmatrix}$ | " | 409 |
| 3 | " | " | 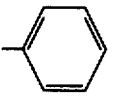 (OC₂H₅) | $-\text{N}(\text{C}_2\text{H}_5)_2$ | " | 411 |
| 4 | " | " | 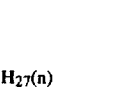 (CH₃, Cl) | $-\text{N}(\text{C}_2\text{H}_4\text{OH})_2$ | " | 408 |
| 5 | " | 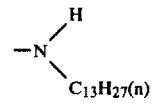 (OCH₃) | 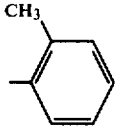 (Cl) | $-\text{N}\begin{smallmatrix}\text{H}\\\text{CH}_3\end{smallmatrix}$ (piperidine) | " | 415 |
| 6 | " | " | 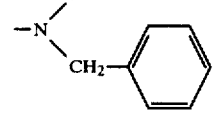 (Cl, OCH₃, OCH₃) | $-\text{N}(\text{C}_3\text{H}_6\text{CN})_2$ | " | 419 |
| 7 | " | 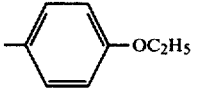 (NHCOCH₃) | " | $-\text{N}(\text{CH}_2\text{CH}_2\text{CH}_2\text{OH})_2$ | " | 416 |
| 8 | " | 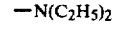 (Cl) | 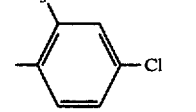 | $-\text{NCH}_2\begin{smallmatrix}\text{H}\\\text{CHCH}_3\\\text{OH}\end{smallmatrix}$ | " | 411 |
| 9 | 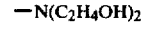 (CF₃) | 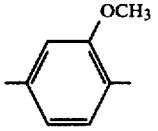 | " | $-\text{N}\begin{smallmatrix}\text{C}_2\text{H}_4\text{OH}\\\text{CH}_2\text{CH}=\text{CH}_2\end{smallmatrix}$ | " | 411 |

TABLE -continued

Structure:

F–C(triazine)–O–[A]–N=N–[B]–N=N–CH(CH₃)(CO)(CONH–[C])
with Z on triazine

| No. | A | B | C | −Z | Hue of Dyed Cloth | $\lambda_{max}$ (acetone) (nm) |
|---|---|---|---|---|---|---|
| 10 | " | 2,5-dimethylphenyl (CH₃, CH₃) | 2,5-diethoxyphenyl (OC₂H₅, OC₂H₅) | −N[C₃H₇(n)]₂ | " | 416 |
| 11 | 2,3,5-trichlorophenyl (Cl, Cl, Cl) | phenyl | phenyl | −N(CH₂−CH=CH₂) | " | 415 |
| 12 | 2-cyanophenyl (CN) | " | " | −NH₂ | " | 416 |
| 13 | 2-butoxyphenyl (OC₄H₉) | " | " | piperazinyl −N(H)N−C₂H₄OH | " | 411 |
| 14 | 3-ethylphenyl (C₂H₅) | 2-methyl-5-acetamidophenyl (CH₃, NHCOCH₃) | " | −N[C₅H₁₁(i)]₂ | " | 411 |
| 15 | phenyl | naphthyl | " | −N[C₉H₁₉(n)]₂ | reddish orange | 419 |
| 16 | 3-bromophenyl (Br) | phenyl | 2-methoxyphenyl (OCH₃) | −NH(CH₂)₈CH=CH(CH₂)₇CH₃ | orange | 412 |

TABLE -continued
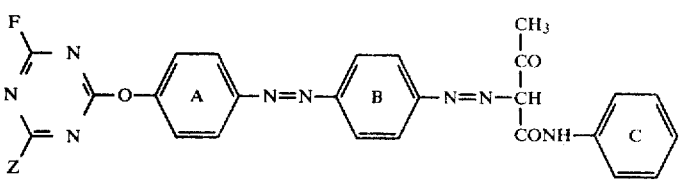
| No. | A | B | C | −Z | Hue of Dyed Cloth | $\lambda_{max}$ (acetone) (nm) |
|---|---|---|---|---|---|---|
| 17 | '' |  OC₃H₇(i) | 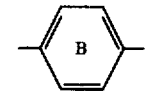 F | 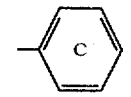 | '' | 410 |
| 18 | 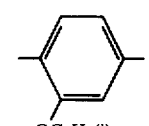 F | 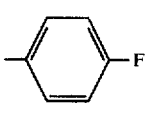 | 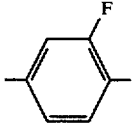 OC₄H₉(n) | 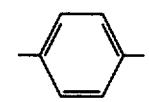 | '' | 410 |
| 19 | 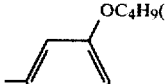 |  CH₃ OCH₃ | 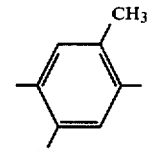 | 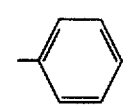 | reddish orange | 419 |
TABLE 6
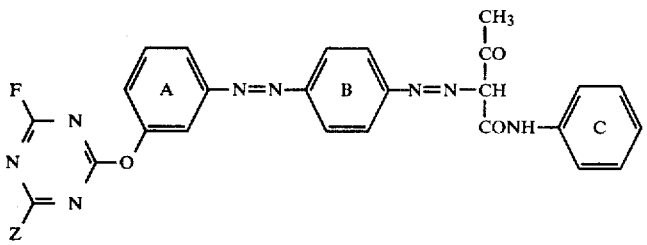
| No. | A | B | C | −Z | Hue of Dyed Cloth | $\lambda_{max}$ (acetone) (nm) |
|---|---|---|---|---|---|---|
| 1 |  | 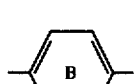 | 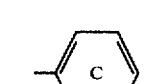 | −N(CH₂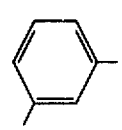)₂ | orange | 409 |
| 2 | '' | 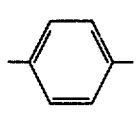 OC₃H₇(n) | '' | 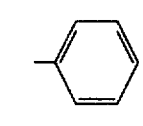 CH₃ −N−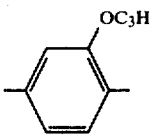−CH₃ | '' | 411 |

TABLE 6-continued
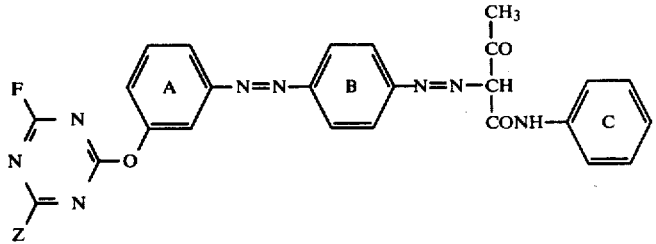
| No. | A | B | C | —Z | Hue of Dyed Cloth | $\lambda_{max}$ (acetone) (nm) |
|---|---|---|---|---|---|---|
| 3 | " | " |  (OC₄H₉(t)) | 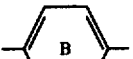 | " | 413 |
| 4 | " |  (CH₃, CH₃) | 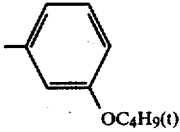 | 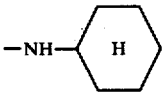 | " | 409 |
| 5 | " | " | 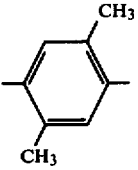 (OCH₃, OCH₃) | —N(CH₃)₂ | " | 411 |
| 6 | " | 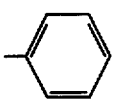 (CH₃, NHCOCH₃) | 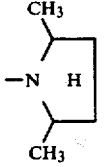 | 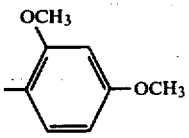 | " | 412 |
| 7 |  (CH₃) | 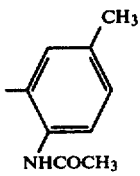 (OCH₃, CH₃) | " | 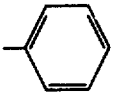 | " | 413 |
| 8 | " | 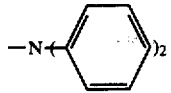 | 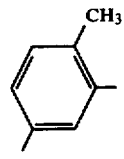 (Cl) | 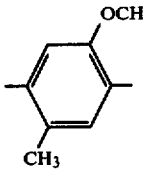 | " | 407 |
| 9 | 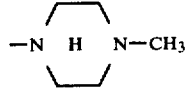 | 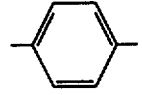 | 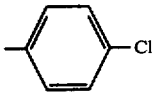 | 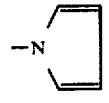 (OCH₃, OCH₃) | reddish orange | 419 |

TABLE 6-continued
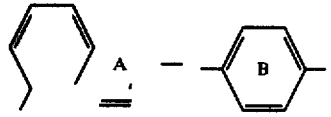
| No. | A | B | C | —Z | Hue of Dyed Cloth | λ$_{max}$ (acetone) (nm) |
|---|---|---|---|---|---|---|
| 10 | Cl (2,4-) | OCH$_3$ | OCH$_3$ | —NH—CH$_2$—C(CH$_3$)=CH—OH | reddish orange | 418 |
| 11 | Br | CH$_3$, CH$_3$, OCH$_3$ | " | —N[C$_4$H$_9$(sec)]$_2$ | reddish orange | 418 |
TABLE 7
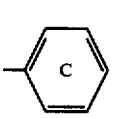
| No. | A | B | C | —Z | Hue of Dyed Cloth | λ$_{max}$ (acetone) (nm) |
|---|---|---|---|---|---|---|
| 1 | (phenyl) | 2,5-diCH$_3$ | phenyl | —N⌒S (thiomorpholino) | orange | 409 |
| 2 | " | " | 3-C$_2$H$_5$-phenyl | —N[C$_7$H$_{15}$(sec)]$_2$ | " | 409 |

TABLE 7-continued

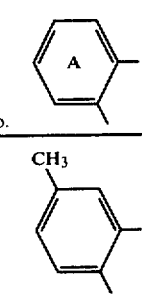

| No. | A | B | C | —Z | Hue of Dyed Cloth | $\lambda_{max}$ (acetone) (nm) |
|---|---|---|---|---|---|---|
| 3 | CH₃ (dimethylphenyl) | " | CH₃ (dimethylphenyl with CH₃) | —NHC₂H₄OH | " | 409 |
| 4 | " | (phenyl) | " | —N(CH₃)(C₃H₆N(C₂H₅)₂) | " | 409 |
| 5 | " | " | (4-Cl-phenyl) | —N[CH₂CH₂N(CH₃)₂]₂ | " | 407 |
| 6 | C₃H₇(n) (methylphenyl) | " | OCH₃ (dimethoxyphenyl) | —N[C₄H₉(sec)]₂ | " | 412 |
| 7 | C₄H₉(t) (methylphenyl) | Cl (chlorophenyl) | (phenyl) | —N(morpholino) | " | 413 |
| 8 | Br (bromophenyl) | (phenyl) | Cl, OCH₃ (phenyl) | —N(C₂H₅)(C₂H₄-m-tolyl) | " | 411 |
| 9 | OC₄H₉(n) (methylphenyl) | Br (phenyl) | C₄H₉(sec) (phenyl) | —N(CH₂CH₂OCH₃)₂ | " | 410 |

TABLE 7-continued

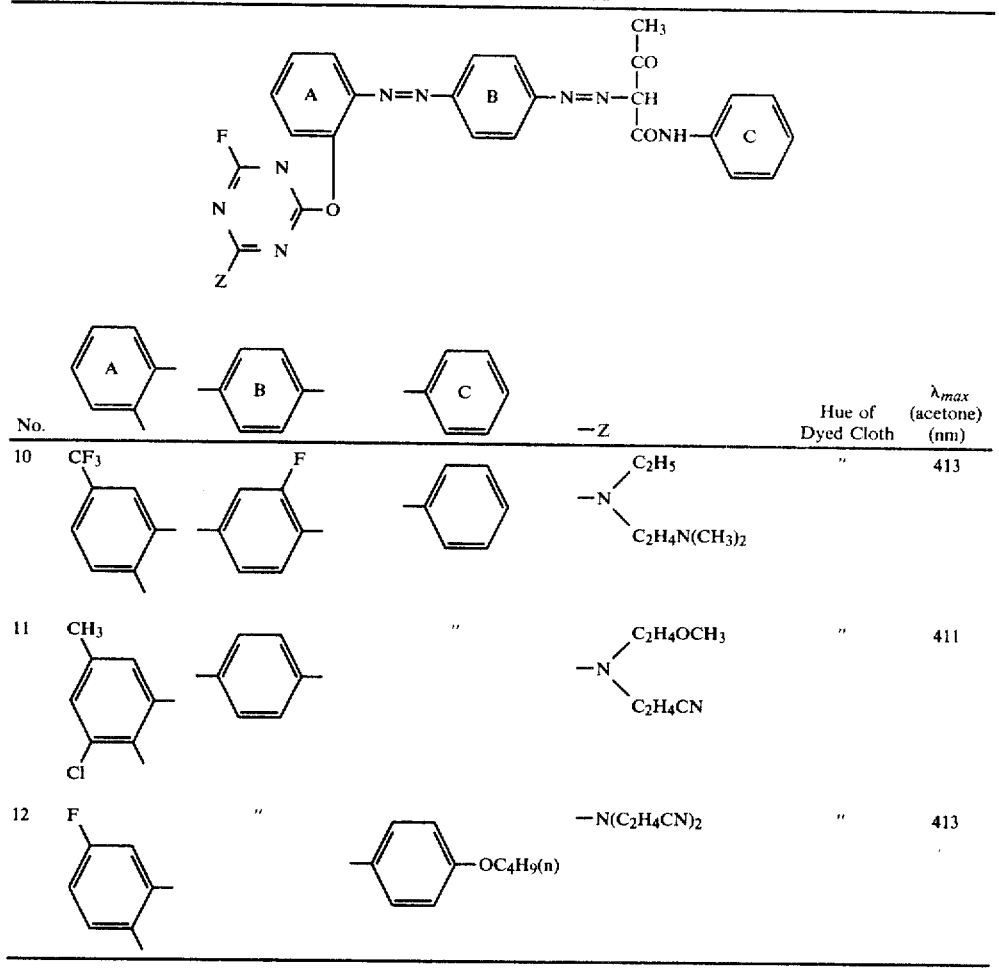

| No. | A | B | C | —Z | Hue of Dyed Cloth | $\lambda_{max}$ (acetone) (nm) |
|---|---|---|---|---|---|---|
| 10 | CF₃ (phenyl) | F (phenyl) | phenyl | —N(C₂H₅)(C₂H₄N(CH₃)₂) | " | 413 |
| 11 | CH₃, Cl (phenyl) | phenyl | " | —N(C₂H₄OCH₃)(C₂H₄CN) | " | 411 |
| 12 | F (phenyl) | phenyl —OC₄H₉(n) | " | —N(C₂H₄CN)₂ | " | 413 |

EXAMPLE 13

A dye composition consisting of 15 parts of disazo dye represented by the formula:

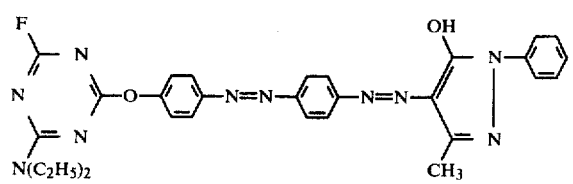

15 parts of a naphthalenesulfonic acid-formaldehyde condensate, and 70 parts of water was processed by the use of a paint shaker as a finely dispersing apparatus to prepare a dye dispersion. The dye dispersion thus prepared was used to prepare a printing color paste having the following composition:

| | parts |
|---|---|
| Dye dispersion | 6.5 |
| 5% Aqueous solution of sodium alginate | 55 |
| Polyethylene glycol dimethyl ether having an average molecular weight of 400 | 9 |
| Water | 29.5 |
| | 100 |

| | parts |
|---|---|
| | (pH: 8.0) |

The thus prepared printing color paste was printed on a polyester/cotton mixed cloth (mixing ratio: 65/35) by the use of a screen printing machine, was subjected to preliminarily drying at 80° C. for 3 minutes, and then was fixed by dry heating at 215° C. for 90 seconds. After washing with water, the cloth was subjected to soaping using a washing solution containing 2 g/l of a nonionic surface active agent (Scourol #900 (trade name), produced by Kao Soap Co., Ltd.) at a bath ratio of 1:30 at 80° C. for 20 minutes. There was thus obtained an orange dyed product having excellent light fastness and wet color fastness.

The dye used in this example was prepared as follows:

In a 50% aqueous solution of acetic acid was dissolved 2.13 g of 4-amino-4'-hydroxyazobenzene, and 3 ml of hydrochloric acid was added thereto. The resulting mixture was cooled to 5° C. or less. Then, 0.7 g of sodium nitrite was added to the mixture while controlling so that the temperature did not exceed 5° C. The thus formed diazonium salt solution was added to a solution of 1.73 g of 1-phenyl-3-methyl-5-pyrazolone in a diluted aqueous sodium hydride solution at a temperature of 5° C. or less while controlling so that the pH was within the range of from 8 to 9. The disazo compound precipitated was separated by filtration, washed with water, and dried. A mixture of 3.97 g of the dye thus prepared, 2.1 g of 2,4-difluoro-6-(diethyl)aminotriazine, 1.0 g of triethylamine, and 1.0 g of anhydrous potassium carbonate was added to 100 ml of acetone and heated to reflux for 3 hours to achieve a condensation reaction. The reaction solution was added dropwise to 1,000 ml of water. The precipitate formed was separated by filtration, washed with water, and then dried at room temperature. There was thus obtained 5.2 g of yellow powder of the dye represented by the above described formula. For this dye, $\lambda_{max}$ (acetone) was 422 nm.

EXAMPLE 14

13, and there was thus obtained an orange dyed product having excellent light fastness and wet color fastness.

The dye used in this example was prepared as follows:

4-Amino-4'-hydroxyazobenzene was diazonated and then coupled to 1-(m-chlorophenyl)-3-methyl-5-pyrazolone in accordance with the method as described in Example 13 to prepare a dye. The thus prepared dye was reacted with 2,4-difluoro-5-[di(n-propyl)amino]-triazine in N-methyl-2-pyrrolidone by the use of triethylamine as an acid binding agent to prepare the desired dye. For this dye, $\lambda_{max}$ (acetone) was 416 nm.

EXAMPLE 15

A dye composition consisting of 10 parts of disazo dye represented by the formula:

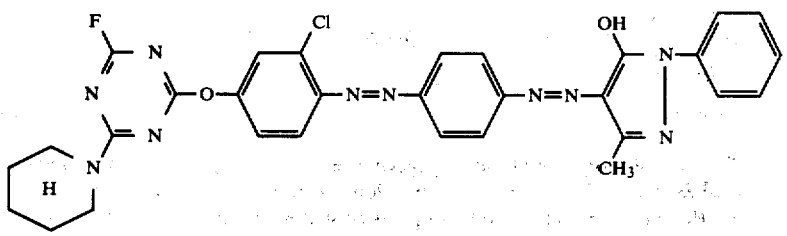

A dye composition consisting of 15 parts of disazo dye represented by the formula:

2 parts of polyoxyethylene glycol nonylphenol ether (HLB: 8.9), and 88 parts of diethylene glycol diacetate

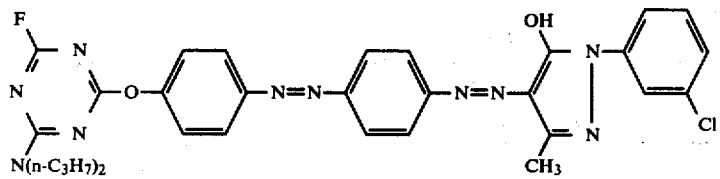

10 parts of Pluronic surface active agent, Pluronic L 64 (trade name, produced by Asahi Denka Kogyo Co., Ltd.), and 75 parts of water was processed by the use of a sand grinder as a finely dispersing apparatus to prepare a dye dispersion. The dye dispersion thus formed was used to prepare a printing color paste having the following composition:

|  | parts |
| --- | --- |
| Dye dispersion | 7 |
| 5% Aqueous solution of sodium alginate | 55 |
| Diacetate of polypropylene glycol having an average molecular weight of 300 | 10 |
| Polyethylene glycol diglycidyl ether having an average molecular weight of 200 | 3 |
| Water | 25 |
|  | 100 |
|  | (pH: 6.5) |

The thus prepared printing color paste was printed on a cotton broad (cotton yarn number: 40) which had been subjected to a silket processing, by the use of a screen printing machine, was subjected to intermediate drying at 80° C. for 3 minutes, and then was treated using super heated steam at 185° C. for 7 minutes. Thereafter, a washing processing was performed in accordance with the method as described in Example was ground by the use of a paint conditioner as a finely dispersing apparatus to prepare a dye ink.

A mixture of 10 parts of the above prepared dye ink and 55 parts of mineral turpentine was gradually added to 55 parts of an aqueous solution having the composition as described hereinafter while stirring with a homomixer at a rate of 5,000 to 7,000 rpm, and the resulting mixture was further stirred until it became uniform to prepare a viscous o/w type emulsion color paste.

| Composition of Aqueous Solution | parts |
| --- | --- |
| Water | 31 |
| Repitol G (trade name, special nonionic surface active agent produced by Dai-ichi Kogyo Seiyaku Co., Ltd.) | 3.8 |
| Sodium trichloroacetate | 0.1 |
|  | 34.9 |

The thus prepared color paste was printed on a polyester/cotton mixed cloth (mixing ratio: 65/35) by the use of a screen printing machine, dried at 100° C. for 2 minutes, and then treated using super heated steam at 175° C. for 7 minutes. Thereafter, the cloth was washed with a hot tetrachloroethylene bath containing a small amount of water and dried, and there was thus obtained an orange dyed product which had excellent light fastness and wet color fastness, and was not stained in the white background.

The dye used in this example was prepared as follows:

4-Amino-2'-chloro-4-hydroxyazobenzene was diazonated and then coupled to 1-phenyl-3-methyl-5-pyrazolone in accordance with the method as described in Example 13 to prepare a dye. This dye was reacted with 2,4-difluoro-6-piperidine in accordance with the method as described in Example 13 to obtain the desired dye. For this dye, $\lambda_{max}$ (acetone) was 427 nm.

EXAMPLE 16

A dye composition consisting of 16 parts of disazo dye represented by the formula:

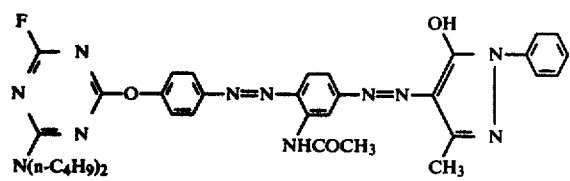

7 parts of polyoxyethylene glycol nonylphenyl ether (HLB: 13.3), 3 parts of a naphthalenesulfonic acidformaldehyde condensate, and 74 parts of water was finely dispersed by the use of a sand grinder as a finely dispersing apparatus to prepare a dye dispersion. This dye dispersion was used to prepare a padding bath having the following composition:

| | parts |
|---|---|
| Dye dispersion | 6 |
| Tetraethylene glycol dimethyl ether | 15 |
| Water | 79 |
| | 100 |
| | (pH: 8.0) |

A polyester/cotton mixed cloth (mixing ratio: 65/35) was impregnated with the above prepared padding bath and squeezed at a squeezing ratio of 45% and, thereafter, it was dried at 100° C. for 2 minutes and fixed by dry heating at 200° C. for 1 minute. By washing the cloth with a hot ethanol bath, there was obtained an orange dyed product having excellent light fastness and wet color fastness.

The dye used in this example was prepared in accordance with the method as described in Example 13. For this dye, $\lambda_{max}$ (acetone) was 431 nm.

EXAMPLE 17

Printing was performed in the same manner as in Example 13 except that a nylon/rayon mixed cloth (mixing ratio: 50/50) was used and the dry heating fixing temperature was 185° C. There was thus obtained a reddish yellow dyed product having good wet color fastness and light fastness.

EXAMPLE 18

Using a series of disazo dyes shown in Table 8, the same printing as described in Example 13 was performed.

All the dyded products had good light fastness and wet color fastness.

The hue of each dyed product and $\lambda_{max}$ (acetone) of each dye used are shown in Table 8.

TABLE 8

| No. | A | B | C | —X— | —Z | Hue of Dyed Cloth | $\lambda_{max}$ (acetone) (nm) |
|---|---|---|---|---|---|---|---|
| 1 | phenyl | phenyl | phenyl-Cl | —O— | —N[C$_3$H$_7$(i)]$_2$ | orange | 417 |
| 2 | phenyl | phenyl | phenyl-Cl (ortho) | —S— | —N(C$_2$H$_4$OH)(CH$_2$—CH=CH$_2$) | orange | 415 |
| 3 | phenyl | phenyl | phenyl-Cl,Cl (2,4) | —O— | —N(C$_2$H$_5$)(C$_2$H$_4$OH) | orange | 414 |
| 4 | phenyl | phenyl | phenyl-SO$_2$NH$_2$ | —O— | —NHC$_{14}$H$_{29}$(sec) | orange | 414 |

TABLE 8-continued

Structure:

A triazine ring (with N, N, N and substituents X and Z) — X — [ring A] — N=N — [ring B] — N=N — C(=C(OH)—N(H)—[ring C])—C(CH₃)=N

| No. | A | B | C | —X— | —Z | Hue of Dyed Cloth | $\lambda_{max}$ (acetone) (nm) |
|---|---|---|---|---|---|---|---|
| 5 | phenyl (1,4) | phenyl (1,4) | phenyl (3-SO₂NHC₂H₅) | —O— | —NH₂ | orange | 414 |
| 6 | phenyl (1,4) | phenyl (1,4) | phenyl (2-Br) | —O— | —N(C₂H₄OCH₃)₂ | orange | 415 |
| 7 | phenyl (1,4) | phenyl (1,4-, 3-CH₃) | phenyl | —O— | —N(H)(C₂H₄CN) | orange | 423 |
| 8 | phenyl (1,4) | phenyl (1,4-, 3-CH₃) | phenyl | —O— | piperazine-N—C₂H₄OH | orange | 423 |
| 9 | phenyl (1,4) | phenyl (1,4-, 3,5-di-CH₃) | phenyl (3-F) | —O— | —N(C₂H₄CN)₂ | orange | 421 |
| 10 | phenyl (1,4) | phenyl (1,4-, 3-C₄H₉(n)) | phenyl | —O— | —N(C₄H₉)₂ | orange | 424 |
| 11 | phenyl (1,4) | phenyl (1,4-, 3-CH₃, 6-NHCOCH₃) | phenyl | —O— | —NHC₁₈H₃₇(n) | reddish orange | 434 |
| 12 | phenyl (1,4) | phenyl (1,4-, 3-OC₃H₇(i)) | phenyl | —S— | —NH(CH₂)₈CH=CH(CH₂)₇CH₃ | reddish orange | 441 |
| 13 | phenyl (1,4) | phenyl (1,4-, 3-OC₃H₇(i)) | phenyl (3-SO₂NH₂) | —O— | —N[C₉H₁₉(n)]₂ | reddish orange | 436 |
| 14 | phenyl (1,4) | phenyl (1,4-, 3,6-di-OCH₃) | phenyl | —O— | 2,6-dimethylpiperidin-1-yl (—N with two CH₃) | brown | 465 |

TABLE 8-continued

Structure: triazine-X-A-N=N-B-N=N-C(OH)=C(CH3)-C(=N-phenyl-C)

| No. | A | B | C | —X— | —Z | Hue of Dyed Cloth | λ_max (acetone) (nm) |
|---|---|---|---|---|---|---|---|
| 15 | phenyl | naphthyl | phenyl | —O— | —NH—(cyclohexyl-H) | brown | 457 |
| 16 | Cl-phenyl | CH3-phenyl | phenyl | —O— | —N[C4H9(sec)]2 | orange | 427 |
| 17 | Cl-phenyl | CH3, OCH3-phenyl | phenyl | —S— | —N(phenyl)2 | reddish orange | 438 |
| 18 | Cl-phenyl | NHCOCH3-phenyl | phenyl | —O— | —NHC5H11(i) | reddish orange | 437 |
| 19 | Cl-phenyl | C3H7(n)-phenyl | SO2N(CH3)2-phenyl | —O— | morpholino (—N, O, H) | orange | 423 |
| 20 | Cl-phenyl | OC4H9(i)-phenyl | Br-phenyl | —O— | pyrrole (—N) | reddish orange | 435 |
| 21 | Cl-phenyl | phenyl | phenyl | —O— | —N[C3H7(n)]2 | orange | 427 |
| 22 | Cl,Cl-phenyl | phenyl | phenyl | —O— | —NH—(OCH3, OCH3-phenyl) | orange | 433 |
| 23 | Br-phenyl | phenyl | phenyl | —O— | —N(CH2—CH=CH2)2 | orange | 427 |
| 24 | F-phenyl | phenyl | Cl-phenyl | —O— | —N(C3H6OH)(C3H6CN) | orange | 427 |
| 25 | CF3-phenyl | phenyl | phenyl | —O— | —N[CH2CH2N(CH3)2]2 | orange | 428 |

TABLE 8-continued

| No. | A | B | C | —X— | —Z | Hue of Dyed Cloth | $\lambda_{max}$ (acetone) (nm) |
|---|---|---|---|---|---|---|---|
| 26 | 2-CF₃ phenyl | phenyl | phenyl | —O— | —NHCH₂CH(OH)CH₃ | orange | 428 |
| 27 | 2-CF₃ phenyl | phenyl | 3-Cl, 4-SO₂NHC₂H₅ phenyl | —O— | —N(CH₂CH₂CH₂CH₂OH)₂ | orange | 419 |
| 28 | 2-CF₃ phenyl | 2-C₄H₉(n) phenyl | phenyl | —S— | —N[C₄H₉(i)]₂ | orange | 429 |
| 29 | 2-CF₃ phenyl | phenyl | phenyl | —O— | —N(C₂H₅)₂ | orange | 427 |
| 30 | 2-CF₃ phenyl | 2-NHCOCH₃ phenyl | phenyl | —O— | —NH—CH₂—(4-CH₃-phenyl) | reddish orange | 437 |
| 31 | 2-CF₃, 4-Cl phenyl | phenyl | 2,4-Cl₂ phenyl | —O— | —N[C₃H₇(i)]₂ | reddish orange | 426 |
| 32 | 2-C₄H₉(n) phenyl | phenyl | 3-Cl phenyl | —S— | —N(C₂H₄OC₂H₄OCH₃)₂ | reddish orange | 419 |
| 33 | 2-C₄H₉(n) phenyl | phenyl | phenyl | —O— | —NH—CH₂CH₂—phenyl | reddish orange | 423 |
| 34 | 2-C₂H₅ phenyl | phenyl | phenyl | —O— | piperidino (—NH ring) | orange | 423 |
| 35 | 2-C₂H₅ phenyl | phenyl | 3-SO₂NHC₄H₉(n) phenyl | —O— | thiomorpholino | orange | 418 |
| 36 | 2-C₂H₅ phenyl | 2-CH₃ phenyl | 2,4-Cl₂ phenyl | —O— | NHC₈H₁₇(sec) | orange | 416 |

TABLE 8-continued

Structure:

N≡N—C(Z)=N—N=C(X)—A—N=N—B—N=N—C(OH)=C(CH₃)—C(=N—C₆H₅)— ... (triazine-based azo dye with groups A, B, C)

| No. | A | B | C | —X— | —Z | Hue of Dyed Cloth | λ$_{max}$ (acetone) (nm) |
|---|---|---|---|---|---|---|---|
| 37 | 2-OC₃H₇(i), 5-Me phenyl | 4-Me phenyl | phenyl | —S— | —N(CH₃)(C₂H₄OC₂H₄OCH₃) | orange | 425 |
| 38 | 2-OC₃H₇(i), 5-Me phenyl | 3-CH₃ phenyl | phenyl | —O— | —N(C₂H₅)(C₂H₄N(C₂H₅)₂) | orange | 424 |
| 39 | 2-OC₃H₇(i), 5-Me phenyl | 2-C₂H₅, 5-OCH₃ phenyl | 3-SO₂NH₂ phenyl | —O— | —N(CH₃)(C₆H₁₁) | reddish orange | 434 |
| 40 | 2-OCH₃ phenyl | 4-Me phenyl | phenyl | —O— | —N[C₇H₁₅(n)]₂ | orange | 424 |
| 41 | 2-OCH₃ phenyl | 2-OCH₃, 5-NHCOCH₃ phenyl | phenyl | —O— | —N(C₄H₈)N—CH₃ (N-methylpiperazinyl) | brown | 452 |
| 42 | 2-OCH₃ phenyl | naphthyl | 3-F phenyl | —O— | —N(CH₂CH₂CH₂OH)(CH₂C₆H₅) | brown | 454 |
| 43 | 2-CH₃, 5-Cl phenyl | 4-Me phenyl | phenyl | —O— | —N(C₆H₁₁)₂ | orange | 427 |
| 44 | 2-CH₃, 5-Cl phenyl | 4-Me phenyl | 3-SO₂NHC₃H₇(i) phenyl | —O— | —N(CH₃)(CH₂—CH=CH₂) | orange | 422 |
| 45 | 2-CH₃, 5-Cl phenyl | 3-NHCOCH₃ phenyl | phenyl | —O— | —N(C₂H₄OCH₃)(C₂H₄CN) | reddish orange | 439 |
| 46 | 2-CH₃, 5-Cl phenyl | 2,5-(CH₃)₂ phenyl | 3-Br phenyl | —S— | —NH(C₃H₆OH) | orange | 420 |

TABLE 8-continued

[Structure: pyrimidine-X-A-N=N-B-N=N-C(OH)=C(CH3)... with N-phenyl C group]

| No. | A | B | C | —X— | —Z | Hue of Dyed Cloth | $\lambda_{max}$ (acetone) (nm) |
|---|---|---|---|---|---|---|---|
| 47 | 2,4-dimethylphenyl (CH3, CH3) | phenyl | phenyl | —O— | —N[C3H7(i)]2 | orange | 424 |
| 48 | 2,4-dimethylphenyl (CH3, CH3) | C2H5-phenyl | phenyl-SO2N(n-C3H7)2 | —O— | —N[C4H9(n)]2 | orange | 418 |
| 49 | 2,4-dimethylphenyl (CH3, CH3) | CH3-phenyl | phenyl-SO2N(n-C3H7)2 | —O— | —N[C4H9(i)]2 | orange | 418 |
| 50 | 2-Cl, 4-CH3-phenyl | phenyl | phenyl | —O— | —NH-C14H29(sec) | orange | 427 |
| 51 | 2-Cl, 4-CH3-phenyl | OC2H5-phenyl | Cl-phenyl | —S— | —N(H)(CH2—C(CH3)=CH—OH) | reddish orange | 431 |

EXAMPLE 19

A dye composition consisting of 15 parts of disazo dye represented by the formula:

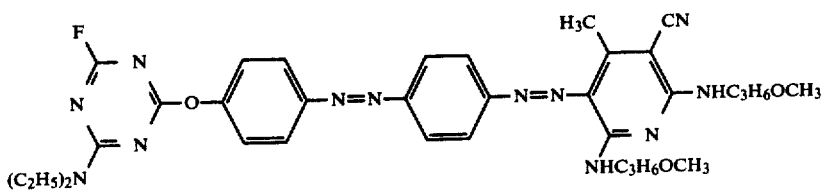

15 parts of a naphthalenesulfonic acid-formaldehyde condensate, and 70 parts of water was processed by the use of a paint shaker as a finely dispersing apparatus to prepare a dye dispersion. This dye dispersion was used to prepare a printing color paste having the following composition:

| | parts |
|---|---|
| Dye dispersion | 6.5 |
| 5% Aqueous solution of sodium alginate | 55 |
| Polyethylene glycol dimethyl ether having an average molecular weight of 400 | 9 |
| Water | 29.5 |

The thus prepared printing color paste was printed on a polyester/cotton mixed cloth (mixing ratio: 65/35) by the use of a screen printing machine, dried at 80° C. for 3 minutes, and then fixed by dry heating at 215° C. for 90 seconds. After washing with water, the cloth was subjected to soaping using a washing solution containing 2 g/l of a nonionic surface active agent (Scourol #900 (trade name), produced by Kao Soap Co., Ltd.) at a bath ratio of 1:30 at 80° C. for 20 minutes, and there was thus obtained a yellowish red dyed product having excellent light fastness and wet color fastness.

The dye used in this example was prepared as follows:

In 50 ml of a 50% by volume aqueous solution of acetic acid was dissolved 2.13 g of 4-amino-4'-hydroxyazobenzene, and 3 ml of hydrochloric acid was added thereto. Then, 0.7 g of sodium nitrite was added thereto. During this time, the temperature was regulated so as not to exceed 5° C. The thus formed diazonium salt solution was added to a solution of 2.92 g of 2,6-bis(methoxypropylamino)-3-cyano-4-methylpyridine in methanol at a temperature of 5° C. or less while maintaining the pH at 4. The disazo compound precipitated was separated by filtration, washed with water, and dried. A mixture of 5.16 g of the above prepared dye, 2.1 g of 2,4-difluoro-6-(diethylamino)triazine, 1.0 g of triethylamine, and 1.0 g of anhydrous potassium carbonate was added to 100 ml of acetone and heated to reflux to achieve a condensation reaction. The reaction solution was added dropwise to 1,000 ml of water. The precipitate formed was separated by filtration, washed with water, and dried at room temperature. There was thus obtained 6.6 g of dark red powder of dye represented by the above described formula (yield: 94%). For this dye, $\lambda_{max}$ (acetone) was 490 nm.

EXAMPLE 20

A dye composition consisting of 15 parts of disazo dye represented by the formula:

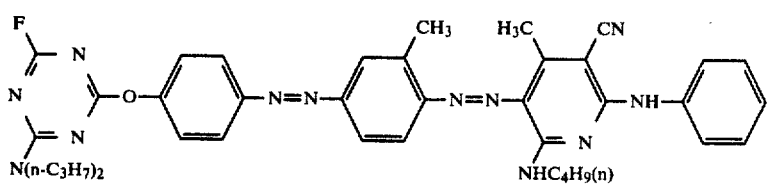

10 parts of a Pluronic surface active agent. Pluronic L 64 (trade name, produced by Asahi Denka Kogyo Co., Ltd.), and 75 parts of water was finely dispersed by the use of a sand grinder as a finely dispersing apparatus to prepare a dye dispersion. This dye dispersion was used to prepare a printing color paste having the following composition:

| | parts |
|---|---|
| Dye dispersion | 7 |
| 5% Aqueous solution of sodium alginate | 55 |
| Diacetate of polypropylene glycol having an average molecular weight of 300 | 10 |
| Polyethylene glycol diglycidyl ether having an average molecular weight | 3 |
| of 200 | |
| Water | 25 |
| | 100 |
| | (pH: 6.5) |

The thus prepared printing color paste was printed on a cotton broad (cotton yarn number: 40) which had been subjected to a silket processing, by the use of a screen printing machine, was subjected to intermediate drying at 80° C. for 3 minutes, and then was treated using super heated steam at 185° C. for 7 minutes. Thereafter, by applying the same washing treatment as described in Example 19, there was obtained a yellowish red dyed product having excellent light fastness and wet color fastness.

The dye used in this example was prepared as follows:

4-Amino-5-methyl-4'-hydroxyazobenzene was diazonated and then coupled to 2-anilino-3-cyano-4-methyl-6-(n-butylamino)pyridine in accordance with the method as described in Example 19 to prepare a dye. By reacting the thus formed dye with 2,4-difluoro-6-di(n-propyl)aminotriazine in N-methyl-2-pyrrolidone by the use of triethylamine as an acid binding agent, there was obtained the desired dye. For this dye, $\lambda_{max}$ (acetone) was 491 nm.

EXAMPLE 21

A dye composition consisting of 10 parts of disazo dye represented by the formula:

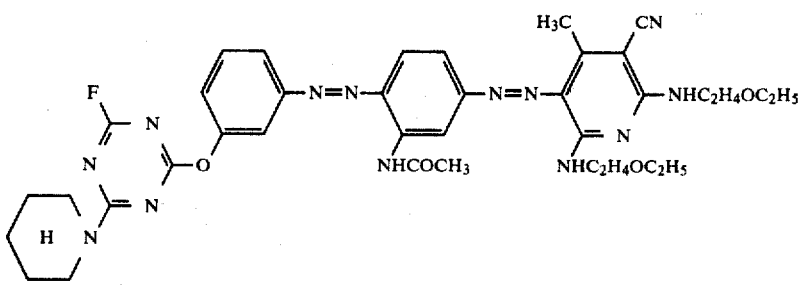

2 parts of polyoxyethylene glycol nonylphenyl ether (HLB: 8.9), and 88 parts of diethylene glycol diacetate was grounded by the use of a paint conditioner as a finely dispersing apparatus to prepare a dye ink.

A mixture of 10 parts of the above prepared dye ink and 55 parts of mineral turpentine was gradually added to 35 parts of an aqueous solution having the composition as described hereinafter while stirring by a homomixer at a rate of 5,000 to 7,000 rpm, and the resulting mixture was further stirred until it became uniform to prepare a viscous o/w type emulsion color paste.

Composition of Aqueous Solution

| Composition of Aqueous Solution | parts |
|---|---|
| Water | 31 |
| Repitol G (trade name, special nonionic surface active agent produced by Dai-ichi Kogyo Seiyaku Co., Ltd.) | 3.8 |
| Sodium trichloroacetate | 0.1 |
| | 34.9 |

The thus prepared color paste was printed on a polyester/cotton fixed cloth (mixing ratio: 65/35) by the use of a screen printing machine, dried at 100° C. for 2 minutes, and then treated using super heated steam at 175° C. for 7 minutes. Thereafter, the cloth was washed with a hot tetrachloroethylene bath containing a small amount of water and dried, and there was thus obtained a red dyed product which had excellent light fastness and wet color fastness and was not stained in the white background.

The dye used in this example was prepared as follows:

2′-Acetylamino-4′-amino-3-hydroxyazobenzene was diazonated and then coupled to 2,6-bis(ethoxyethylamino)-3-cyano-4-methylpyridine in the same manner as in Example 19 to prepare a dye. By reacting the thus formed dye with 2,4-difluoro-6-piperidinotriazine in the same manner as in Example 19, there was obtained the desired dye. For this dye, $\lambda_{max}$ (acetone) was 495 nm.

EXAMPLE 22

A dye composition consisting of 16 parts of disazo dye represented by the formula:

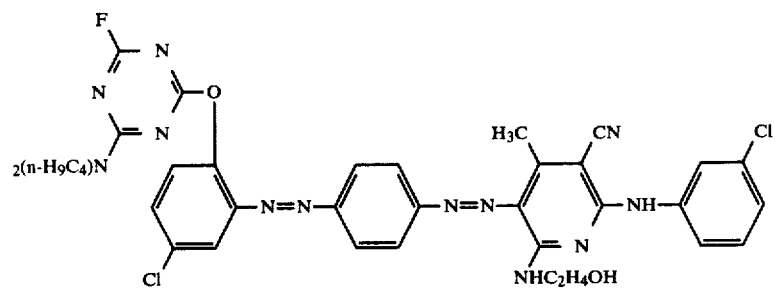

7 parts of polyoxyethylene glycol nonylphenyl ether (HLB: 13.3), 3 parts of a naphthalenesulfonic acid-formaldehyde condensate, and 74 parts of water was finely dispersed by the use of a sand grinder as a finely dispersing apparatus to prepare a dye dispersion. This dye dispersion was used to prepare a padding bath having the following composition:

| | parts |
|---|---|
| Dye dispersion | 6 |
| Tetraethylene glycol dimethyl ether | 15 |
| Water | 79 |
| | 100 (pH: 8.0) |

A polyester/cotton mixed cloth (mixing ratio: 65/35) was impregnated with the above prepared padding bath and squeezed at a squeezing ratio of 45% and, thereafter, it was dried at 100° C. for 2 minutes and fixed by dry heating at 200° C. for 1 minute. By washing the cloth with a hot ethanol bath, there was obtained a red dyed product having excellent light fastness and wet color fastness.

The dye used in this example was prepared in accordance with the method as described in Example 19. For this dye, $\lambda_{max}$ (acetone) was 503 nm.

EXAMPLE 23

Printing was performed in the same manner as in Example 19 except that a nylon/rayon mixed cloth (mixing ratio: 50/50) was used and the dry heating fixing temperature was 185° C. There was thus obtained a red printed product having good wet color fastness and light fastness.

EXAMPLE 24

Using a series of disazo dyes shown in Tables 9 to 11, printing was performed in the same manner as in Example 19.

All the dyed clothes had good light fastness and wet color fastness. The hue of each dyed cloth and $\lambda_{max}$ (acetone) of each dye used are shown in Tables 9 to 11.

TABLE 9

Structure:

A-N=N-B-N=N-pyridine with substituents: F, N, N, Z on triazine (left); H3C, CN, NHX, NHY on pyridine (right); with O linking A to triazine carbon.

| No. | A | B | —X | —Y | —Z | Hue of Dyed Cloth | $\lambda_{max}$ (acetone) (nm) |
|---|---|---|---|---|---|---|---|
| 1 | ⌬ (p-phenylene) | ⌬ (p-phenylene) | p-CH₃-C₆H₄- | —C₃H₆OCH₃ | —N(CH₃)(C₂H₄OH) | yellowish red | 490 |
| 2 | " | " | m-OC₂H₅-C₆H₄- | —CH₂—CH=CH₂ | —N[C₃H₇(i)]₂ | " | 492 |
| 3 | " | " | p-CF₃-C₆H₄- | —CH₂—C₆H₅ | —NHC₇H₁₅(sec) | " | 488 |
| 4 | " | " | 2,4-Cl₂-C₆H₃- | —C₂H₄OH | —N(C₂H₄OCH₃)₂ | " | 488 |

| No. | A | B | —X | —Y | —Z | Hue of Dyed Cloth | $\lambda_{max}$ (acetone) (nm) |
|---|---|---|---|---|---|---|---|
| 5 | ⌬ | ⌬ | —C₆H₅ | —C₆H₁₃(n) | —N(C₂H₄OH)₂ | yellowish red | 490 |
| 6 | " | " | —C₂H₄OC₂H₅ | —C₄H₈OC₂H₅ | morpholino (—N(CH₂CH₂)₂O) | " | 491 |
| 7 | " | " | —C₂H₄OH | —(CH₂)₃OCH(CH₃)CH₂OCH₃ | —N(C₆H₁₁)₂ | " | 491 |
| 8 | " | " | —(CH₂)₂O(CH₂)₂OH | —C₄H₉(i) | —NHC₁₄H₂₉(sec) | " | 491 |

TABLE 9-continued

Structure:

[F-substituted triazine]—O—[ring A, phenyl]—N=N—[ring B, phenyl]—N=N—[pyridine with H₃C, CN, NHX, NHY substituents]

| | F | A | B | X | Y | | λ |
|---|---|---|---|---|---|---|---|
| 9 | 2,4-dimethylphenyl with C₃H₇(n) | ⌬ (phenyl) | —C₂H₄OCH₃ | —C₂H₄OH | —N(CH₂CH=CH₂)₂ (—CH₂CH=CH₂) | " | 490 |
| 10 | " | " | " | —C₅H₁₁(n) | —NHC₂H₅ | " | 490 |
| 11 | 2,4-dimethylphenyl with OC₂H₅ | " | " | —C₄H₉(n) | —N(C₂H₅)₂ | red | 494 |
| 12 | " | —CH₂-phenyl | —C₅H₁₀OH(n) | —N(CH₂—CH=CH₂)₂ | " | 494 |
| 13 | 2,5-dimethylphenyl with CH₃, CH₃ | —CH₂-phenyl | —C₅H₁₀OH(n) | —NH₂ | yellowish red | 493 |
| 14 | " | 3-chlorophenyl | —CH₂—CH=CH₂ | —NH(H)—C₂H₄CN | " | 493 |
| 15 | 2,5-dimethylphenyl with NHCOCH₃ | —C₃H₆OH | —C₃H₆OH(n) | —N(piperazine with —C₂H₄OH) | " | 493 |
| 16 | 4-methylphenyl | —C₂H₄OCH₃ | —C₂H₄OCH₃ | —N[C₅H₁₁(i)]₂ | red | 505 |
| 17 | 2,4-dimethylphenyl with CF₃ | " | —CH₂—CH=CH₂ | —CH₂—CH=CH₂ | —NH(CH₂)₈CH=CH(CH₂)₇CH₃ | " | 505 |

TABLE 9-continued

| | A substituent | B substituent | X | Y | Z | color | λ |
|---|---|---|---|---|---|---|---|
| 18 | 2,5-diCl phenyl | OC4H9(n)-phenyl | —C4H9OH | —N[C9H19(n)]2 | " | " | 505 |
| 19 | 2,3,6-triCl-methylphenyl | C4H9(n)-phenyl | —C6H12OH | H, C14H29(sec) amine | " | " | 508 |
| 20 | 2-Br-methylphenyl | phenyl | —C2H4OC2H5 | H, CH2-C6H4-CH3 amine | " | deep red | 510 |
| 21 | " | 2,5-diMe-phenyl | " | CH3, C3H6N(C2H5)2 amine | " | yellowish red | 500 |
| 22 | 2-CN-methylphenyl | 2-OC3H7(i)-5-Me phenyl | " | —N(C2H4OC2H4OCH3)2 | " | " | 502 |
| 23 | OC4H9(n)-dimethylphenyl | 4-methylphenyl | —C3H6OCH3 | —N(CH2-phenyl)2 | " | deep red | 512 |
| 24 | " | 3-F-phenyl | " | CH3, 3-methylphenyl amine | " | yellowish red | 490 |

TABLE 9-continued

Structure:

Ar-A-N=N-B-[pyridine with CN, H3C, NHX, NHY substituents]

where Ar = fluoro/cyano triazine-O-phenyl

| No. | Ar | A | B | X | Y | Color | λ |
|---|---|---|---|---|---|---|---|
| 25 | 2,4-di-CH3-phenyl (F,CN triazine) | phenyl | phenyl | " | —NH—C6H11 | " | 490 |
| 26 | 2,5-di-CH3-4-NHCOCH3-phenyl | " | " | " | 3-Br-phenyl | " | 492 |
| 27 | 4-CH3-phenyl | " | " | " | 3-(i)C3H7-phenyl | " | 493 |
| 28 | " | " | —C3H6OCH3 | " | 2,6-di-CH3 pyrrolidine (N-H) | " | — |
| 29 | 4-CH3-2-C2H5-phenyl | " | " | —(CH2)3OCHCH2OCH3 with CH3 | —N(CH3)2 | red | 496 |
| 30 | 2,5-di-CH3-4-OCH3-phenyl | " | " | —C3H6OC3H7(i) | —NH—CH2—C(CH3)=CH—OH | yellowish red | 491 |
|    |    |    |    |    | —N(C6H5)2 |    |    |
|    |    |    |    |    | N-methylpiperazine | red | 497 |

TABLE 10

Structure:

A ring connected via -O- to a triazine (with F and Z substituents), A-N=N-B-N=N-pyridine ring bearing CH3, CN, NHX, NHY groups.

| No. | A | B | -X | -Y | -Z | Hue of Dyed Cloth | $\lambda_{max}$ (acetone) (nm) |
|---|---|---|---|---|---|---|---|
| 1 | 3,5-dimethylphenyl | 4-methylphenyl | 3-CF₃-phenyl | —C₂H₄OC₂H₅ | —NHC₅H₁₁(i) | yellowish red | 488 |
| 2 | " | 2-OC₂H₅-5-methylphenyl | 3-OC₂H₅-phenyl | " | —NC₂H₄—⟨C₆H₄-OCH₃⟩ (H on N) | red | 495 |
| 3 | " | " | 3-C₂H₅-phenyl | " | —NHCH₂CHOH—CH₃ (with OH) | " | 494 |
| 4 | " | 2,5-dimethylphenyl | 4-Br-phenyl | " | —N(CH₂CH₂CH₂OH)₂ | yellowish red | 491 |
| 5 | " | " | 2-Cl-phenyl | —C₂H₄OC₃H₇(i) | —NH—⟨2,5-di-OCH₃-phenyl⟩ | " | 491 |

TABLE 10-continued

Structure:

$$\text{A}-N=N-\text{B}-N=N-\underset{\underset{NHY}{\overset{H_3C\quad CN}{\diagup\!\!\!\diagdown}}}{\text{pyridine}}-NHX$$

where A bears -O-C(=N-X)(N-Y)(N-Z) type triazine substituent (as shown in structure with F, N, Z on triazine).

| No. | A | B | —X | —Y | —Z | Hue of Dyed Cloth | λ_max (acetone) (nm) |
|---|---|---|---|---|---|---|---|
| 6 | " (2,6-diMe) | CH₃ / NHCOCH₃ (2,5-diMe with NHCOCH₃) | phenyl | " | pyrrol-1-yl (N-linked) | red | 494 |
| 7 | " | CH₃ / OCH₃ | " | " | —N(C₃H₆OH)(C₂H₄CN) | " | 496 |
| 8 | " | OCH₃ / CH₃ | " | —C₃H₆OH | —NHC₅H₁₀OH(n) | " | 496 |
| 9 | CH₃ (2,4-diMe) | C₂H₅ / C₂H₅ | —CH₂CH₂OCH₂CH₂OCH₃ | —CH₂CH₂OCH₂CH₂OCH₃ | —N(H)(C₁₃H₂₇(n)) | yellowish red | 491 |
| 10 | " | " | —CH₂—CH=CH₂ | —CH₂—CH=CH₂ | —N(H)(CH₂—C(CH₃)=CH—OH) | " | 491 |

TABLE 10-continued

Structure:

A(phenyl)—N=N—B(phenyl)—N=N—pyridine ring bearing H3C, CN, NHX, NHY substituents; A ring has O-linked triazine with F and Z substituents.

| No. | A | B | —X | —Y | —Z | Hue of Dyed Cloth | λ_max (acetone) (nm) |
|---|---|---|---|---|---|---|---|
| 11 | (2,6-dimethylphenyl) | (2,5-dimethylphenyl) | —C4H8OH(n) | —CH2—C6H5 | —N(H)C2H4C6H5 | " | 491 |
| 12 | (3-chloro-5-methylphenyl) | " | —C3H6OCH3 | —C3H6OCH3 | —NHC4H9(sec) | red | 501 |
| 13 | " | " | —C3H6OC3H7(i) | —C3H6OC3H7(i) | —N(C2H5)2 | " | 501 |

TABLE 11

[Structure: A-ring connected via N=N to B-ring, connected via N=N to pyridine ring bearing CH₃, CN, NHX, and =NHY groups; A-ring has O-linked triazine bearing F and Z substituents]

| No. | A | B | —X | —Y | —Z | Hue of Dyed Cloth | λ$_{max}$ (acetone) (nm) |
|---|---|---|---|---|---|---|---|
| 1 | (2-methylphenyl) | (2,5-dimethylphenyl) | 4-F-C₆H₄— | —C₂H₄OH | —N(CH=CH-S-CH=CH) (thiomorpholino) | yellowish red | 489 |
| 2 | " | " | 2-OC₂H₅-C₆H₄— | —C₃H₆OCH₃ | —N[C₇H₁₅(sec)]₂ | yellowish red | 492 |
| 3 | " | " | 3-Cl-C₆H₄— | —C₃H₆OC₂H₅ | —N(C₃H₆CN)₂ | yellowish red | 489 |
| 4 | 3,4-dimethylphenyl (CH₃) | (4-methylphenyl) | —C₆H₅ | —C₄H₉(n) | 3-methylpiperidino | yellowish red | 491 |
| 5 | 4-C₃H₇(n)-3-methylphenyl | " | " | —C₅H₁₀OH | —NHC₂H₄OH | yellowish red | 491 |
| 6 | 4-C₄H₉(t)-3-methylphenyl | " | " | —C₆H₁₂OH | —N(C₂H₄OH)₂ | yellowish red | 491 |
| 7 | 4-OC₄H₉(n)-3-methylphenyl | " | " | —C₅H₁₁(n) | —N[C₉H₁₉(n)]₂ | yellowish red | 493 |

TABLE 11-continued

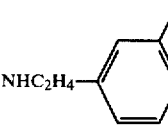

| No. | A | B | —X | —Y | —Z | Hue of Dyed Cloth | λ_max (acetone) (nm) |
|---|---|---|---|---|---|---|---|
| 8 | Br-phenyl | " | —$C_2H_4OCH_3$ | —$C_2H_4OCH_3$ | —$NHC_5H_{11}(n)$ | red | 500 |
| 9 | $CF_3$-phenyl | " | —$C_2H_4OH$ | —$C_6H_{13}(n)$ | —$NHC_2H_4$—(3-methylphenyl) | red | 501 |
| 10 | " | " | —$C_3H_6OH$ | —$C_5H_{11}(n)$ | —$N(C_2H_5)_2$ | red | 501 |
| 11 | " | $OC_3H_7(i)$-phenyl | —$CH_2$—phenyl | —$CH_2$—CH=$CH_2$ | —$N[C_3H_7(i)]_2$ | deep red | 510 |
| 12 | $CH_3$, Cl-phenyl | " | —$C_5H_{11}(n)$ | —$CH_2$—phenyl | piperidino | red | 505 |
| 13 | CN-phenyl | " | —$C_3H_6OCH_3$ | —$C_3H_6OCH_3$ | morpholino | deep red | 512 |

While the invention has been described in detail and with reference to specific embodiments thereof, it will be apparent to one skilled in the art that various changes and modifications can be made therein without departing from the spirit and scope thereof.

What is claimed is:

1. A reactive disazo dye for cellulose-containing fibers, represented by the formula (I):

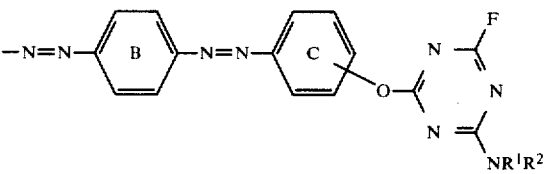

wherein

D is 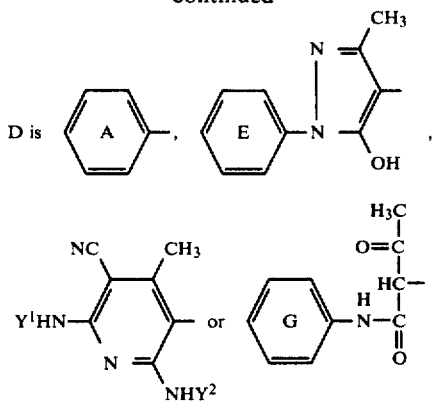

(wherein

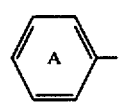

is phenyl which may be substituted by lower alkyl, lower alkoxy, phenoxy, nitro, cyano, halogen, trifluoromethyl, an acetylamino, an aminocarbonyl which may be substituted by a lower alkyl, an aminosulfonyl which may be substituted by lower alkyl, lower alkylcarbonyl, or lower alkylsulfonyl; $Y^1$ is phenyl which may be substituted by halogen, trifluoromethyl, lower alkyl, or lower alkoxy, or $Y^2$; $Y^2$ is allyl, benzyl, or alkyl which may be substituted by hydroxy or lower alkoxy;

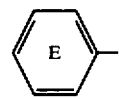

is phenyl which may be substituted by halogen, sulfamoyl, or lower alkylsulfamoyl; and

is phenyl which may be substituted by halogen, lower alkyl, or lower alkoxy),

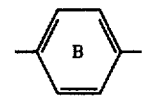

is naphthylene, or phenylene which may be substituted by lower alkyl, lower alkoxy, halogen, or acetylamino,

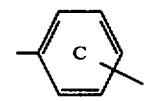

is phenylene which may be substituted by halogen, trifluoromethyl, lower alkyl, or lower alkoxy, and $R^1$ and $R^2$ are each hydrogen, alkyl which may be substituted by cyano, hydroxy, lower alkoxy, or dialkylamino, or combine together in combination with N to form a 5- or 6-membered nitrogen-containing heterocyclic ring, the total number of carbon of $R^1$ and $R^2$ being 18 or less.

2. The reactive disazo dye for cellulose-containing fibers as claimed in claim 1, represented by the general formulas:

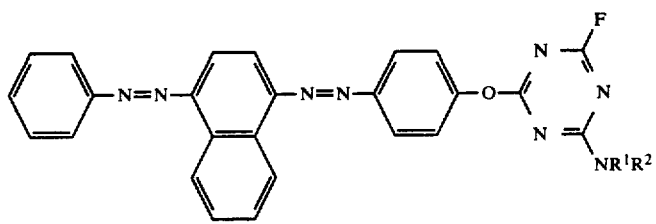

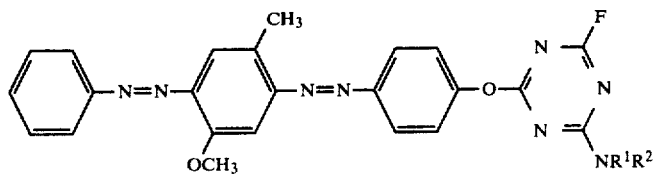

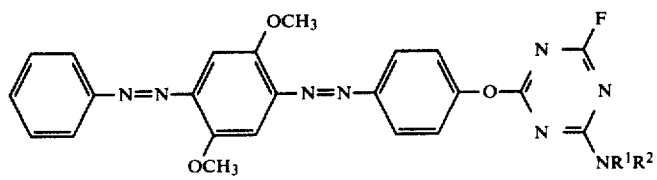

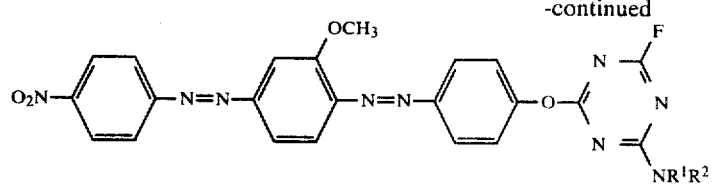

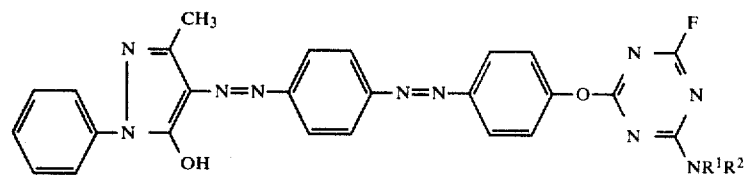

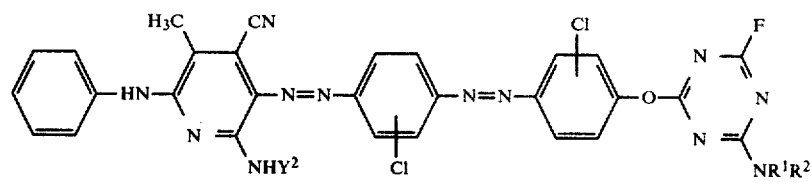

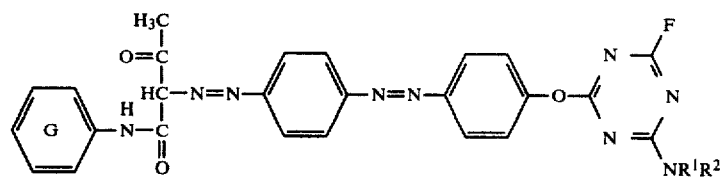

wherein $R^1$ and $R^2$ are each hydrogen, or alkyl, alkenyl, a cyclohexyl, aryl or aralkyl which may be substituted by cyano, hydroxy, lower alkoxy, or dialkylamino, or combine together in combination with nitrogen (N) to form a 5- or 6-membered nitrogen-containing heterocyclic ring, the total number of carbons of $R^1$ and $R^2$ being 18 or less; and

is phenyl which may be substituted by halogen, lower alkyl, or lower alkoxy.

* * * * *